(12) United States Patent
Kroeger

(10) Patent No.: US 10,298,910 B1
(45) Date of Patent: May 21, 2019

(54) INFRASTRUCTURE FREE INTRINSIC CALIBRATION

(71) Applicant: Zoox, Inc., Foster City, CA (US)

(72) Inventor: Till Kroeger, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/023,507

(22) Filed: Jun. 29, 2018

(51) Int. Cl.
*G06K 9/46* (2006.01)
*H04N 13/246* (2018.01)
*G06T 11/60* (2006.01)

(52) U.S. Cl.
CPC ............. *H04N 13/246* (2018.05); *G06K 9/46* (2013.01); *G06T 11/60* (2013.01)

(58) Field of Classification Search
CPC ..................................................... H04N 7/181
See application file for complete search history.

(56) References Cited

U.S. PATENT DOCUMENTS

| | | | | |
|---|---|---|---|---|
| 5,809,161 | A * | 9/1998 | Auty .................. | G01P 3/38 340/937 |
| 8,331,722 | B2 * | 12/2012 | Hunter .................. | H04N 5/217 382/167 |
| 9,386,302 | B2 * | 7/2016 | Zeng .................. | G06T 7/80 |
| 10,032,083 | B2 * | 7/2018 | Yi .................. | G06K 9/00791 |
| 10,176,594 | B2 * | 1/2019 | Tanaka .................. | B60R 1/00 |
| 10,205,867 | B2 * | 2/2019 | Shibahara .................. | H04N 5/04 |
| 2006/0197761 | A1 * | 9/2006 | Suzuki .................. | H04N 7/181 345/427 |
| 2015/0145965 | A1 * | 5/2015 | Livyatan .................. | B60R 1/00 348/47 |
| 2016/0379074 | A1 * | 12/2016 | Nielsen .................. | G06K 9/3241 348/143 |

* cited by examiner

*Primary Examiner* — Paulos M Natnael
(74) *Attorney, Agent, or Firm* — Lee & Hayes, P.C.

(57) ABSTRACT

This disclosure is directed to calibrating sensors mounted on an autonomous vehicle. First image data and second image data representing an environment can be captured by first and second cameras, respectively (and or a single camera at different points in time). Point pairs comprising a first point in the first image data and a second point in the second image data can be determined and projection errors associated with the points can be determined. A subset of point pairs can be determined, e.g., by excluding point pairs with the highest projection error. Calibration data associated with the subset of points can be determined and used to calibrate the cameras without the need for calibration infrastructure.

20 Claims, 8 Drawing Sheets

INFRASTRUCTURE FREE INTRINSIC CALIBRATION

BACKGROUND

The use of sensors by various systems requires accurate calibration to be useful. For example, an autonomous vehicle may have multiple cameras, LIDAR sensors, radar sensors, and/or the like to detect objects, e.g., objects approaching the vehicle and/or objects the vehicle is approaching, and sensor data about those objects can be necessary to navigate relative to those objects. In some environments, including those in which other pedestrians, bicyclists, and other vehicles may be present, potentially fatal collisions may occur if such sensors are not calibrated properly. Current calibration techniques use infrastructure, such as fiducial markers, to calibrate sensors. For example, by capturing data of a fiducial marker, a correction term can be determined and applied to subsequently-captured data. While the infrastructure may be readily available at a location at which a system is manufactured or at other locations, subsequent calibration requires bringing the system (e.g. an autonomous vehicle) to a location that has infrastructure, resulting in undesirable downtime for the system and/or, for those examples which rely on sensors for navigation, potentially unsafe travel to the location. Additionally, current calibration techniques may require a human operator, which may make the process manual, slow, and potentially imprecise. Existing calibration techniques that attempt to mitigate these drawbacks are often computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
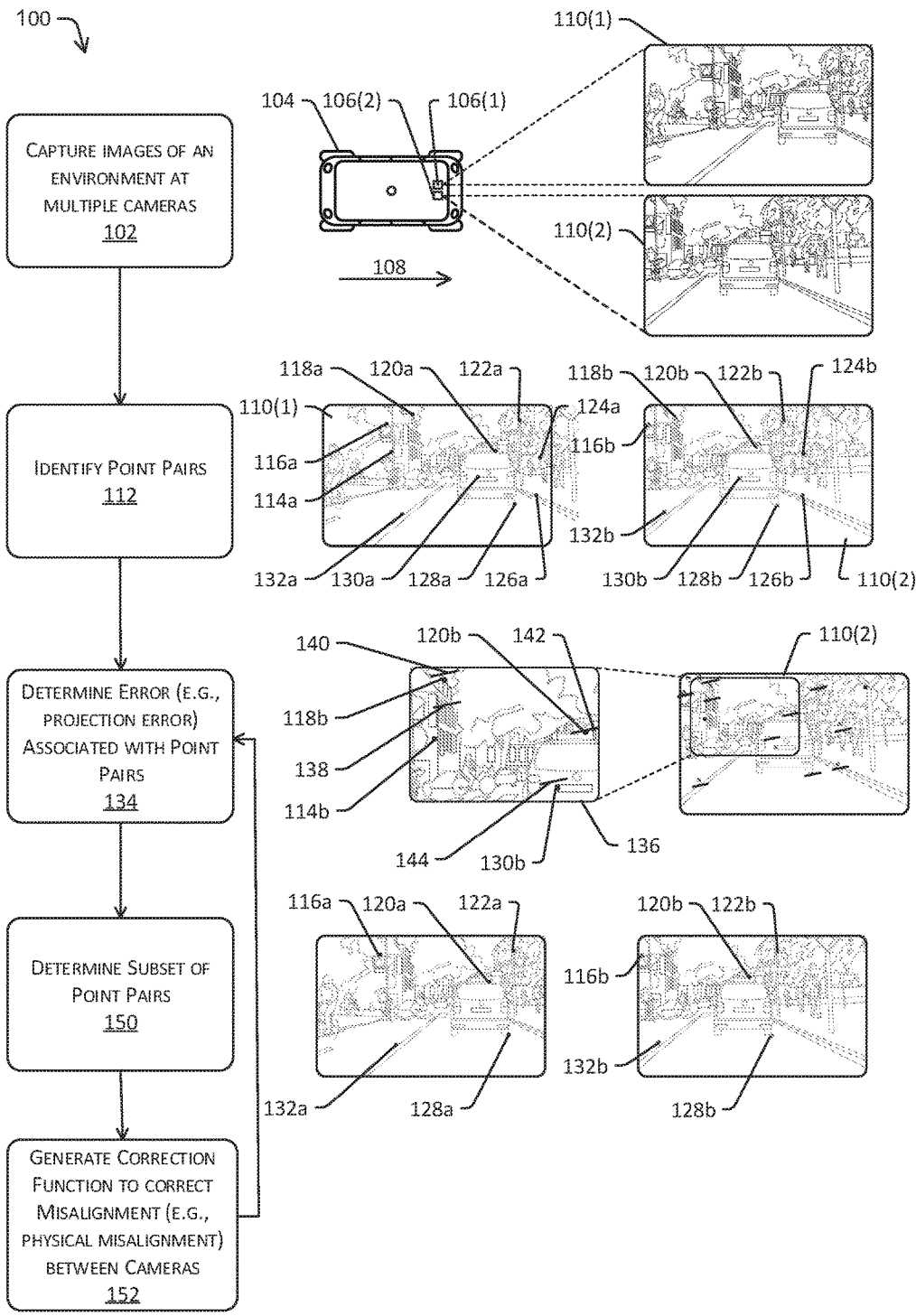
FIG. 1 includes textual and visual flowcharts to illustrate an example method for calibrating extrinsic characteristics of sensors mounted on an autonomous vehicle as described herein.

Techniques described herein are directed to calibrating sensors of a system without infrastructure, e.g., without fiducial markers. In general, such calibration may refer to either "extrinsic" calibration (that is determining one or more of a location or orientation of the sensor relative to some origin, e.g. another sensor, an origin of the system, etc.) or "intrinsic" calibration (that is determining one or more parameters about the sensor itself, e.g., a focal length, a center point, a lens distortion model, and the like). Throughout the specification, an example of such a system is an autonomous vehicle having multiple sensors (of various modalities), though any other system is contemplated (e.g. smartphones having multiple image sensors, robotic manipulators having various sensor modalities, and the like). In one such example (i.e. where the system is an autonomous vehicle), the autonomous vehicle can include multiple sensors (of the same or different modalities), which can represent overlapping fields of view. A first sensor, e.g., a first camera, can capture first data, e.g., a first image, of an environment and a second sensor, e.g., a second camera, can capture second data, e.g., a second image, of the environment. When the first and second sensors are correctly calibrated (with respect to each other, with respect the vehicle, and/or internally), the first data and the second data can be combined to produce an aligned representation of the environment. However, when the sensors are improperly calibrated, combining the sensor data may result in an inaccurate, or "blurry," representation of the environment. In a real-world example, as applied to autonomous vehicles and as an illustration of the need for a highly accurate calibration, a misalignment of sensors on the order of 0.5-degrees may result in an inability to determine with certainty a lane in which an object 100 meters away is travelling. When calibrated manually, however, physical tolerances of the vehicle, sensors, and mounts may only provide a positional tolerance with certainty on the order of about 2.0 degrees. Accordingly, sensors have the potential to be misaligned upon installation.

In examples described herein, calibration techniques can be used to calibrate an array of cameras mounted on a vehicle. In some implementations, cameras may be mounted to capture images covering the 360-degrees around the autonomous vehicle. The calibration techniques can include using epipolar geometry to determine calibration data. More specifically, techniques can include determining point pairs in images captured substantially simultaneously by two cameras with overlapping fields of view. For example, a first point in a point pair may correspond to a feature in a first image and a second point in the point pair may correspond to the same feature in a second image, captured by a different camera. Once the point pairs are determined, an amount of error can be determined for each point pair and a subset of point pairs may be selected based on the error. In some implementations, the amount of error may correspond to a projection error determined by projecting epipolar lines associated with the points on the first image or the second image onto the other of the first image and the second image and comparing those epipolar lines to the previously identified points. Calibration data associated with the point pairs can be determined then used to calibrate the cameras relative to each other such that the points are constrained to lie along the epipolar lines.

In some instances, the calibration techniques may also include constraining the calibrated cameras relative to the vehicle. For instance, techniques described herein may use well-calibrated lidar data (e.g., point cloud data) to calibrate cameras relative to the vehicle. In some implementations, techniques described herein may analyze image data to determine feature edges, e.g., using a Canny edge detection algorithm, and compare points in the lidar data indicative of depth discontinuities to these feature edges.

Accordingly, in some implementations, epipolar geometry may be used to analyze corresponding images and align a plurality of cameras relative to each other. However, because epipolar geometry does not consider three-dimensional aspects of the environment, this analysis may only align the cameras relative to each other (e.g., the cameras, as a group of sensors, may lack a correct scale, or may otherwise be offset with respect to any one or more of an x-direction, y-direction, z-direction, roll, pitch, or yaw). The lidar data, which does consider the three-dimensional characteristics of the environment (e.g., feature edges) can be used to further constrain the camera sensors, thereby removing any scale ambiguity and/or translational/rotational offsets. These two calibrations may be performed simultaneously, e.g., in parallel, across large sets of image data and lidar data to determine calibration data useful to calibrate extrinsic characteristics, e.g., physical misalignment, of cameras on an autonomous vehicle. In some instances, the calibration data may be determined by applying an expectation-maximization algorithm that may consider multiple images from each of a number of cameras and, in some instances, lidar data, to converge at an optimal solution.

In some instances, the calibration techniques described herein can also be used to perform calibration for one or more intrinsic characteristics. Examples of intrinsic characteristics include, but are not limited to, lens distortion, focal length, center point, transmission medium, or the like. Additional calibration characteristics may include, but are not limited to, time delay (e.g., of data received from one or more sensors), temperature, compression, or the like.

Calibration techniques discussed herein can improve the functioning of a computing device by providing a framework to determine optimal calibration for sensors, e.g., an array of cameras, on an autonomous vehicle. By calibrating one or more cameras using the calibration techniques described herein, the cameras can generate data representing an environment with a high degree of accuracy and precision about the environment. For example, cameras that have been calibrated in this manner can provide more accurate data for segmentation, classification, route planning, etc., which can ultimately lead to better safety outcomes while driving. Furthermore, such improved calibration for cameras may improve processing and perception systems, for example, by providing more accurate starting points and better fused data for segmentation, classification, etc. These and other improvements to the functioning of a computing device are discussed.

The calibration techniques discussed herein also represent improvements over conventional calibration. For example, in the past, calibration techniques often required fiducial markers or other infrastructure. For example, some techniques have included mounting a vehicle on a turntable and physically turning the vehicle while monitoring the data captured by sensors on the vehicle. Other systems required human operators to wave such fiducials in the sensors of such vehicles. Such conventional calibration techniques suffer from limited flexibility, often require additional and/or specialized calibration equipment, and/or result in a suboptimal calibration sensors. In contrast, the techniques described herein may allow for infrastructure-free calibration. For example, techniques described herein may be able to automatically adjust for changes in calibration as a vehicle traverses through an environment, e.g., by considering new data as it is recorded. Moreover, because the techniques described require only image data including images captured simultaneously by multiple cameras, calibration sensors may be done on historical data and/or on simulated data. Thus, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or use, and are not limited to autonomous vehicles. In another example, the methods, apparatuses, and systems may be utilized in aviation context. Additionally, the techniques described herein may be used with real data (e.g., captured using one or more sensors), simulated data (e.g., generated by a simulator) or any combination of the two.

FIG. 1 depicts a pictorial flow diagram of an example process 100 for calibrating cameras disposed on an autonomous vehicle, in accordance with implementations of this disclosure. In this example, the process 100 uses epipolar geometry to correct for misalignment, e.g., physical misalignment, of cameras on the autonomous vehicle.

At operation 102, the process can include capturing images of an environment at multiple cameras. In one example, the operation 102 can include capturing images from a plurality of cameras disposed on an autonomous vehicle. As will be appreciated from the disclosure herein, any number of cameras in which each camera has a field of view overlapping with another of the cameras can use the calibration techniques described herein. An example accompanying the operation 102 illustrates a vehicle 104 having a first camera 106(1) and a second camera 106(2) disposed on the vehicle 104. In the illustrated example, the vehicle 104 is traversing through the environment generally in a direction indicated by an arrow 108, although in other embodiments the vehicle may be stationary or moving in a different direction. As also illustrated, the first camera 106(1) captures image data such as an image 110(1) and the second camera 106(2) captures image data such as a second image 110(2). In the illustrated embodiment, the cameras 106(1), 106(2) are generally configured next to each other, both facing in the direction of travel and with significant overlap in their fields of view. In at least some examples, multiple images (e.g. 2) from each camera may be used. As will be described in detail below, matching features from multiple images across cameras may result in better (e.g. more robust) feature selection.

If the image 110(1) and the image 110(2) are captured at substantially the same time, when the cameras 106(1), 106(2) are properly aligned, projecting the image 110(1) on the image 110(2) should result in alignment of the images, e.g., by performing a transformation (i.e. performing one or more of a translation or rotation) between the cameras 106(1), 106(2). However, and as discussed above, many factors may influence the actual translation and/or orientation of the cameras 106(1), 106(2) relative to each other, each contributing to an overall misalignment. For example, manufacturing and/or assembly tolerances associated with the cameras 106(1), 106(2), the vehicle 104, camera mounts (not shown) retaining the cameras 106(1), 106(2) on the vehicle 104, and/or the like, may result in misalignment of the cameras 106(1), 106(2) relative to each other (and relative to an expectation). Additionally, such cameras 106(1), 106(2) may become misaligned through regular driving. Techniques described herein are useful in correcting for misalignment caused by these and other sources.

At operation 112, the process can include identifying point pairs. More specifically, the operation 112 may identify, for portions of the first image 110(1) and the second image 110(2) that overlap, first points 114a, 116a, 118b, 120a, 122a, 124a, 126a, 128a, 130a, 132a in the first image 110(1) and second points 114b, 116b, 118b, 120b, 122b, 124b, 126b, 128b, 130b, 132b in the second image 110(2). In this example, the first points and the second points may be image features, e.g., with the first point 114a corresponding to an image feature or portion in the first image 110(1) and the second point 114b corresponding to the same image feature or portion in the second image 110(2), the first point 116a corresponding to another image feature or portion in the first image 110(1) and the second point 116b corresponding to the same other image feature or portion in the second image 110(2), and so forth. Thus, when the cameras are properly aligned, a calibration function would result in the first point 114a and the second point 114b aligning. As used herein, the first point 114a and the second point 114b comprise a first point pair, the first point 116a and the second point 116b comprise a second point pair, and so forth. Such image features may correspond to, for example, AKAZE, BRISK, SURF, SIFT, ORB, BRIEF, FAST, FREAK, embeddings, and the like. In those examples using multiple frames per camera, such feature matching may be performed between frames and/or between cameras.

The operation 112 may determine correspondence between points, e.g., identify the point pairs, using feature matching. For example, assuming partially overlapping views, the techniques described herein may extract and match image features, e.g., local features, from the corresponding images. In some implementations, matches may be selected based on forward-backward consistent matches between two sets of images from two camera frames exposed at substantially the same time, e.g., the first image 110(1) and the second image 110(2). In some implementations point pairs may be determined further by filtering out some image features. For example, points can be filtered based on a match score, a neighbor ratio threshold (e.g., a Lowe's $1^{st}$-to-$2^{nd}$ neighbor ration threshold), and/or based on a violation of a camera-camera constraint with initial calibration. Examples described herein may assume good intrinsic calibration, which may result when all image evidence for the camera-camera constraint is undistorted, and the optimization operates over linear (or otherwise rectified/undistorted) camera models. Although ten point pairs are illustrated in the example accompanying operation 112, feature matching techniques described herein may provide smaller or larger sets of point pairs. In one non-limiting example, hundreds of point pairs, e.g., up to about 300 point pairs, may be determined between the two images 110(1), 110(2). Moreover, although for clarity the example of FIG. 1 shows only a single pair of images, i.e., the first image 110(1) and the second image 110(2), in other implementations the matching may be done by looking at a series of images, including but not limited to frames in a video stream, or the like, to determine feature matches between frames.

At operation 134, the process can include determining an error associated with the point pairs. For example, techniques described herein may utilize epipolar geometry to determine the error based on a projection error between a point (e.g., the image feature) in one image and an epipolar line corresponding to the point pair in the other image. In at least one example, such an error may comprise the distance between the point and the epipolar line. The graphical example accompanying the operation 134 in FIG. 1 provides a visualization of this technique. Specifically, the example shows the second image 110(2), and for clarity, a magnified portion 136 of the second image 110(2). In addition to including the second points, epipolar lines (visualized as line segments) have been added to the second image 110(2) in an implementation of operation 134 (though such lines are shown for illustration purposes and are not necessarily depicted during calibration). As best illustrated in the magnified portion 136, epipolar lines are visualized as lines 138, 140, 142, 144. The line 138 represents a portion of the epipolar line associated with the point 114a (from the first image 110(1)) in the second image 110(2), the line 140 represents a portion of the epipolar line associated with the point 118a (from the first image 110(1)) in the second image 110(2), the line 142 represents a portion of the epipolar line associated with the point 120a, and line 144 represents a portion of the epipolar line associated with the point 130a in the second image 110(2). When the cameras are properly calibrated, each of the lines 138, 140, 142, 144 should coincide with the corresponding point in the image. Where the points and lines do not coincide illustrates sensor misalignment.

The epipolar lines may be computed using epipolar geometry principles. In epipolar geometry, a fundamental matrix generally describes geometric relationships between points in a three-dimensional environment captured from two positions, e.g., two cameras. In the example of FIG. 1, the fundamental matrix can be used to compute the epipolar lines. In implementations of this disclosure, the fundamental matrix may be determined using a transform computed based on a pose of the autonomous vehicle relative to the one or more sensors (e.g. cameras 196(1), 106(2)), based on matrices relating to intrinsic calibration of the camera(s), and/or based on the six-degrees of freedom associated with the extrinsic calibration of the camera(s). For example, implementations of this disclosure may be used to calibrate for extrinsic misalignment, e.g., physical misalignment, and the pose of the vehicle and the matrix describing the intrinsic calibration associated with the cameras may be fixed during computation of the fundamental matrix, with the six-degrees of freedom associated with the extrinsic calibration being free parameters.

Figure 3:
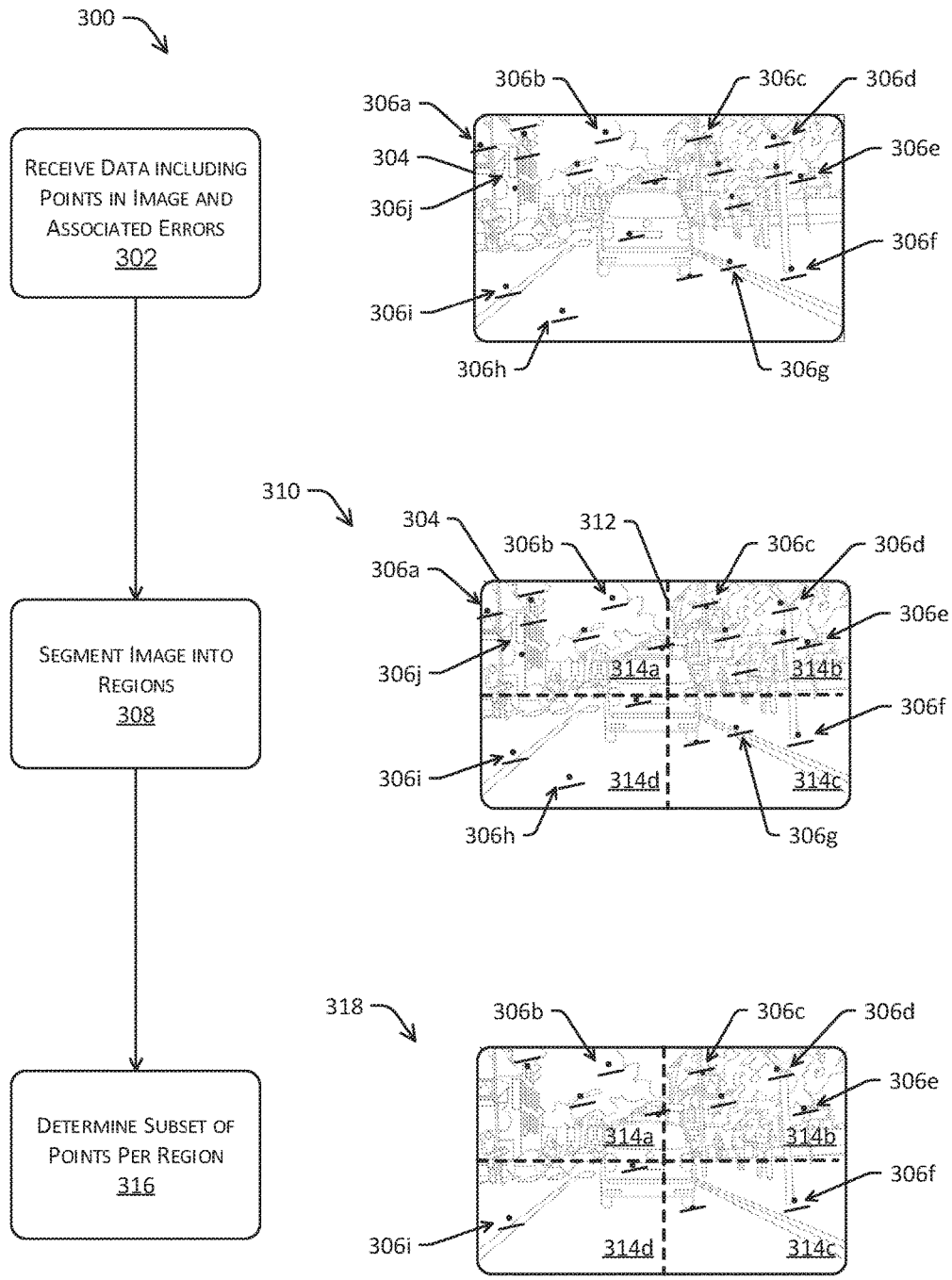
FIG. 3 includes textual and visual flowcharts to illustrate an example method for filtering data in an image as described herein.

At operation 150, the process can include determining a subset of point pairs. Operation 134 may include computing projection error for individual points, e.g., as the distance between the line 140 and the point 118b, the distance between the line 144 and the point 130b, and so forth. In some implementations, point-line combinations that are spaced by or more than a threshold distance can be excluded from the subset of point pairs. In some examples, a position or location of the point may also be used to determine whether points are included in the subset determined at operation 150. For example, it may be desirable to retain points in the subset that are distributed across the entirety of the image(s), e.g., instead of points clustered only in one portion of the image(s). Thus, for example, distances between points in the image and/or distances between each point and some reference point (such as an image edge or image center) may also be used to determine the subset of point pairs. Other implementations may consider a combination of these point characteristics. For instance, in some implementations point-line combinations having a distance equal to or above a first threshold distance may be excluded from the subset, whereas point-line combinations having a distance equal to or above a second threshold distance less than the first threshold distance will be retained only if they are within a threshold distance of an image edge or are above a threshold distance from a neighboring point. Moreover, FIG. 3 illustrates an example of maintaining good point density across an image. Other factors also may be considered to determine the subset of point pairs.

Once the subset is determined, an optimization may be performed to determine a new estimate for the relative transform between the two cameras 106(1), 106(2). In at least some instances, the optimization may associate a unique pose for each scanline of each image. For example, when using rolling shutter cameras, each scanline may be associated with a unique timestamp and a unique pose, such that optimization yields updated estimates for the relative poses of each scanline. Based on the updated estimate, the process 100 may again determine errors, i.e., at operation 134. Thus, the process may be an iterative process, in which the set of point pairs is culled to remove outliers, e.g., outliers resulting from feature matching, and optimize the fundamental matrix. In implementations, the optimization can be performed using an expectation-maximization algorithm to arrive at a preferred solution. The number of iterations may be fixed or may be adaptive. For instance, when an error associated with each of the point-line combinations for an entire subset of point pairs is equal to or below a threshold distance or the subset of points is equal to or below a threshold number of points, the process 100 may advance to operation 152.

At operation 152, the process can include generating a correction function to correct misalignment (e.g., physical misalignment) between the cameras. Because the example described herein uses epipolar geometry to determine alignment between images, the calibration function may only constrain the cameras relative to each other and may contain a scale ambiguity. For example, because the process 100 does not estimate 3D geometry and/or depth, only five of the six degrees of freedom (i.e., x-translation, y-translation, z-translation, roll, pitch, yaw) are fully constrained for each camera. Optimizing both cameras 106a, 106b with these constraints will yield a self-consistent alignment of the cameras, with undetermined scale, position and rotation, and one translation degree of freedom for each camera.

Because the process 100 relies only on image data comprising images captured substantially simultaneously, e.g., not on fiducial markers or other infrastructure, the process 100 can be implemented regardless of time or location. In some implementations, the process 100 can be implemented in real time, while the autonomous vehicle 104 is in operation. Thus, implementations described herein may correct for sensor misalignment as that misalignment occurs, to promote improved sensor accuracy.

As described further herein, the process 100 may be implemented in conjunction with one or more processes that also constrain the sixth-degree of freedom, thereby providing a complete calibration function for the cameras. For instance, as described further in connection with FIG. 6, depth information in the form of point cloud data captured by a lidar sensor may be used to determine depth discontinuities, which depth discontinuities can be mapped to edges detected in the images. An expectation-maximization algorithm may be used to consider the epipolar geometry, as in the process 100, as well as the three-dimensional depth and position, to arrive at an optimized calibration function for the camera pair.

Moreover, although FIG. 1 depicts the vehicle 104 having two cameras 106(1), 106(2) mounted thereon, and the process 100 is described as being used to calibrate the two cameras 106(1), 106(2), the process 100 may be useful to calibrate more than a pair of cameras. Specifically, the process 100 can be used to calibrate any number of cameras, so long as each camera has a field of view that overlaps with another camera's field of view.

The process 100 may be useful to calibrate cameras 106(1), 106(2) relative to each other, but the process 100 may not be useful to calibrate intrinsics of the cameras (in fact, parameters relating to the camera intrinsics may be fixed (i.e., assumed to be correct) in the process of FIG. 1). However, FIG. 2 illustrates a process 200 that may be used in implementations of this disclosure to calibrate intrinsic characteristics, e.g., lens distortion resulting from changes in environmental conditions, focal lengths, center points, and the like.

Figure 2:
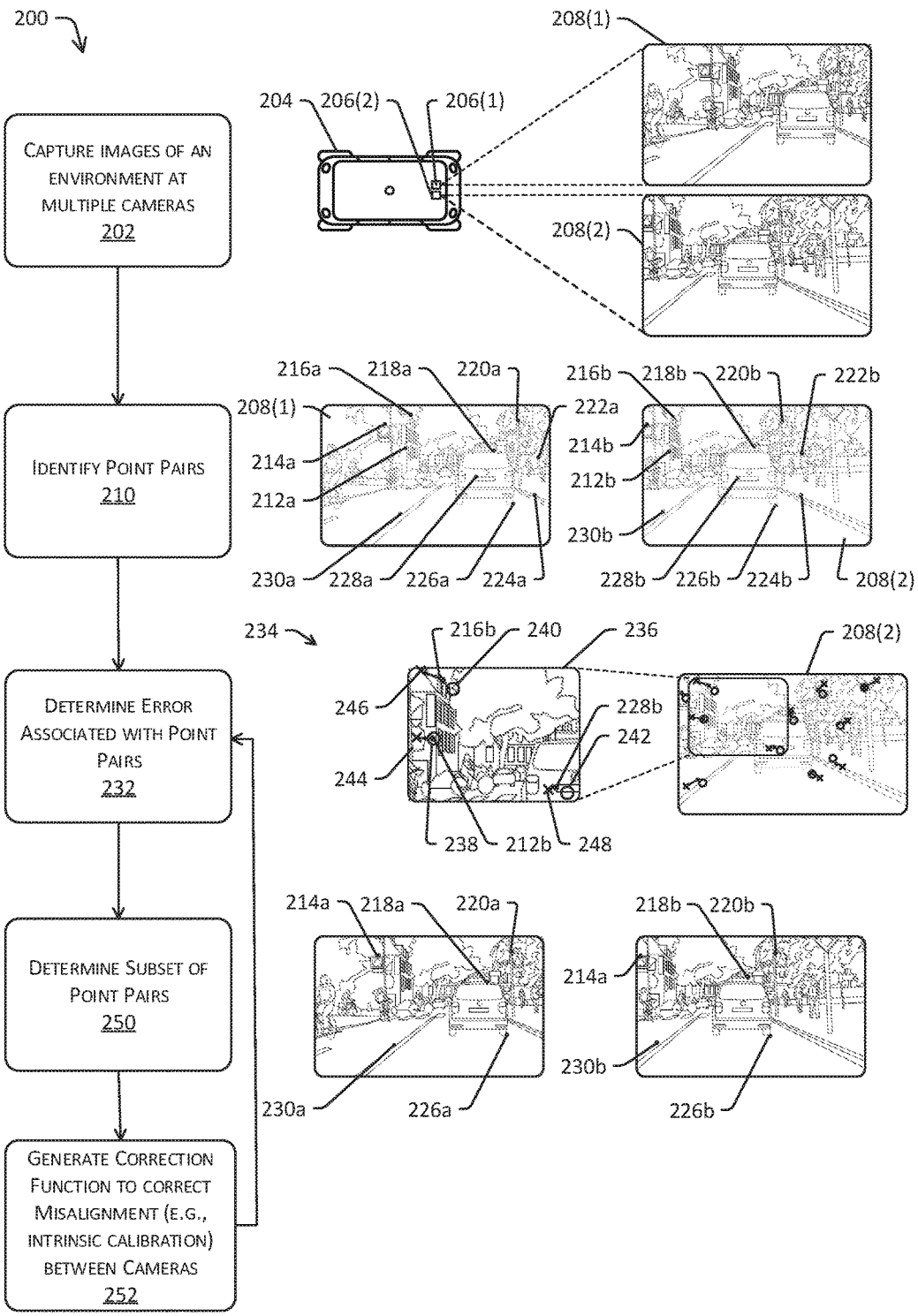
FIG. 2 includes textual and visual flowcharts to illustrate an example method for calibrating intrinsic characteristics of sensors mounted on an autonomous vehicle as described herein.

More specifically, FIG. 2 depicts a pictorial flow diagram of an example process 200 for calibrating cameras disposed on an autonomous vehicle, in accordance with implementations of this disclosure. In this example, the process 100 uses techniques to correct for misalignment, e.g., intrinsic misalignment, of cameras on the autonomous vehicle.

At operation 202, the process can include capturing images of an environment at multiple cameras. An example accompanying the operation 202 illustrates a vehicle 204 having a first camera 206(1) and a second camera 206(2) disposed on the vehicle 204. As also illustrated, the first camera 206(1) captures image data such as an image 208(1) and the second camera 206(2) captures image data such as a second image 208(2). In the illustrated embodiment, the cameras 206(1), 206(2) are generally configured next to each other, both facing in the direction of travel and with significant overlap in their fields of view, however any relative arrangement of the cameras 206 is contemplated so long as there is some overlap in the observed environment (either as captured substantially simultaneously or over different times). The operation 202 may be substantially the same as the operation 102 and thus will not be detailed further herein.

If the image 208(1) and the image 208(2) are captured at substantially the same time, when the cameras 206(1), 206(2) are properly aligned, projecting the image 208(1) on the image 208(2) should result in alignment of the images, e.g., by performing a transformation (i.e. performing one or more of a translation or rotation) between the cameras 206(1), 206(2). However, and as discussed above, many factors may influence the actual calibration of the cameras 206(1), 206(2) relative to each other, each contributing to an overall misalignment. For example, manufacturing and/or assembly tolerances associated with the cameras 206(1), 206(2), including but not limited to distortion parameters such as focal length, lens geometry, center point, camera model (linear, polynomial, etc.) with corresponding coefficients, and/or the like, may result in introduction of errors. For example, though an initial intrinsic calibration may be correct, the camera lens may distort over time, e.g., through temperature fluctuations, routine maintenance, or the like. Techniques described herein are useful in correcting for errors in camera intrinsics as may be caused by these and other sources.

At operation 210, the process can include identifying point pairs. More specifically, the operation 210 may identify, for portions of the first image 208(1) and the second image 208(2) that overlap, first points 212a, 214a, 216a, 218a, 220a, 222a, 224a, 226a, 228a, 230a, in the first image 208(1) and second points 212b, 214b, 216b, 218b, 220b, 222b, 224b, 226b, 228b, 230b, in the second image 208(2). In this example, the first points and the second points may be image features, e.g., with the first point 212a corresponding to an image feature or portion in the first image 208(1) and the second point 212b corresponding to the same image feature or portion in the second image 208(2), the first point 214a corresponding to another image feature or portion in the first image 208(1) and the second point 214b corresponding to the same other image feature or portion in the second image 208(2), and so forth. Thus, when the cameras are properly aligned and correct instrinics are known, a calibration function would result in the first point 212a and the second point 212b aligning when mapping from one image to the other (e.g., using calibrated intrinsics and extrinsics for undistortion, transfer, etc.). As used herein, the first point 212a and the second point 212b comprise a first point pair, the first point 214a and the second point 214b comprise a second point pair, and so forth. Such image features may correspond to, for example, AKAZE, BRISK, SURF, SIFT, ORB, BRIEF, FAST, FREAK, and the like (though any embedding or otherwise is also contemplated).

The operation 210 may be substantially the same as the operation 112 described above. For example, the operation 210 may determine correspondence between points, e.g., identify the point pairs, using feature matching, as described above. Additional details are not repeated here. Also like described above, although ten point pairs are illustrated in the example accompanying operation 210, feature matching techniques described herein may provide smaller or larger sets of point pairs. In one non-limiting example, hundreds of point pairs, e.g., up to about 300 point pairs, may be determined between the two images 208(1), 208(2). Moreover, although for clarity the example of FIG. 1 shows only a single pair of images, i.e., the first image 110(1) and the second image 110(2), in other implementations the matching may be done by looking at a series of images, including but not limited to frames in a video stream, or the like, to determine feature matches between frames. For instance, features may be matched across a plurality of images from the first camera 206(1) and the second camera 206(2). In one non-limiting example, the image 208(1) may be used with one or more additional images from the first camera 206(1) and the image 208(2) may be used with one or more additional images from the second camera 206(2). Assuming partially overlapping views, the techniques described herein may extract and match image features, e.g., local features, from multiple images depicting those features. In some implementations, matches may be selected based on forward-backward consistent matches between two sets of images from two camera frames exposed at substantially the same time, e.g., the first image 208(1) and the second image 208(2).

Unlike the example process 100 that may assume good intrinsic calibration, the process 200 may be used to solve for parameters associated with intrinsic calibration. For example, the process 200 may utilize the point pairs to determine camera intrinsics (such as distortion parameters, focal points, image center point, etc.), depth of points for the cameras, and/or a relative pose between the cameras. Moreover, techniques described herein may calibrate data for lens distortion characteristics. Correcting for lens distortion may be particularly useful for non-linear cameras, for example.

At operation 232, the process 200 can determine errors associated with point pairs. More specifically, using the point pairs, the process 200 may perform an optimization for the intrinsic characteristics, e.g., to determine an estimate for those intrinsic characteristics. An early iteration of such an optimization are illustrated in a visualization 234 accompanying the operation 232. Specifically, the visualization 234 shows the second image 208(2), and for clarity, a magnified portion 236 of the second image 208(2). In addition to including the second points, the visualization 234 includes, for each of the second points, a hollow circle and an "x" (though such symbols are shown for illustration purposes and are not necessarily depicted during calibration).

As best illustrated in the magnified portion 236, the point 212b has an associated hollow circle 238, the point 216b has an associated hollow circle 240, and the point 228b has an associated hollow circle 242. As discussed above, the points 212b, 216b, 228b generally represent the detected location of the features (e.g., distorted location) and in this example, the hollow circles 238, 240, 242 represent reprojections of associated features in the environment. For example, each hollow circle 238, 240, 242 represents a reprojection of the first points corresponding to the points 212b, 216b, 228b. More specifically, the hollow circle 238 may represent a reprojection of the point 212a from the first image 208(a) into the second image 208(b), the hollow circle 240 may represent a reprojection of the point 216a from the first image 208(a) into the second image 208(b), and the hollow circle 242 may represent a reprojection of the point 228a from the first image 208(a) into the second image 208(b), each assuming an associated depth of the points. For example, the projected hollow circles 238, 240, 242 may be based, at least in part, on an estimated depth of the associated points 212b, 216b, 228b. Accordingly, in the visualization, the error associated with the reprojection optimization for the point 212b may be the distance, e.g., the Euclidian distance measured in pixels, between the point 212b and the hollow circle 238. Similarly, the error associated with the point 216b may be the distance between the point 216b and the hollow circle 240 and the error associated with the point 228b may be the distance between the point 228b and the hollow circle 242. Accordingly, in the visualization, when the cameras are properly calibrated, the hollow circles will be concentric with the associated points. Where the points and hollow circles are not concentric, an error still exists.

For cameras having known intrinsics and/or linear cameras, it is possible to solve only for the depth of point, e.g., by constraining the focal length, center point, and distortion characteristics. However, in some implementations, the process 200 may also (or alternatively) solve for these other intrinsic characteristics. As noted above, the points in each of the images are the detected points (e.g., features). In some instances, e.g., when the camera is not a linear camera, the points may be detected in a distorted image. Each "x" in the visualization 234 illustrates an undistorted point corresponding to a detected feature (e.g., by performing an undistortion using camera intrinsics). As best illustrated in the magnified portion 236, the point 212b has an associated "x" 244, the point 216b has an associated "x" 246, and the point 228b has an associated "x" 248. In this example, each "x" 244, 246, 248 represents an undistorted location for each of the points 212b, 216b, 228b and is attached to the corresponding points 212b, 216b, 228b by a line. For example, and as illustrated, it may be expected that the largest distortion is at the edges of the image, whereas distortion may be less likely in the center of the image. Implementations of this disclosure may correct for errors associated with this distortion, e.g., intrinsic errors by performing an intrinsic error optimization over the point pairs. Although not illustrated, an error associated with the optimization may be a distance between a reprojected undistorted point and the corresponding "x," e.g., a distance between the "x" 246 and a reprojection of an undistorted point corresponding to point 216a, or a distance between a reprojected distorted point and the measured point, e.g., a distance between the point 216b and a reprojection of the point 216a which considers camera intrinsics of both cameras.

At operation 250, the process can include determining a subset of point pairs. In some implementations, point-hollow point combinations in the visualization 234 that are spaced by or more than a threshold distance can be excluded from the subset of point pairs. Other filtering techniques are discussed above with reference to operation 150, and will not be repeated herein. Moreover, FIG. 3 illustrates an example of maintaining good point density across an image, which may be used to determine the subset of points at the operation 250.

Once the subset is determined, an optimization may be performed. Such an optimization may, based on the errors defined above, be used to determine a new estimate for the intrinsic parameters for the cameras 206(1), 206(2) and/or new estimates for depths associated with the selected points. Such optimizations may be performed jointly (i.e. depth and intrinsics are solved for in a single optimization) or iteratively (i.e. alternating between keeping intrinsics fixed and optimizing for depth and keeping depths fixed and optimizing for intrinsics).

Based on the updated estimates, the process 200 may again determine errors, i.e., at operation 232. Thus, the process may be an iterative process, in which the set of point pairs is culled to remove outliers, e.g., outliers resulting from feature matching, and optimize the intrinsic calibration matrix. In implementations, the optimization can be performed using an expectation-maximization algorithm to arrive at a preferred solution. The number of iterations may be fixed or may be adaptive. For instance, when an error associated with each of the point-hollow point combinations for an entire subset of point pairs is equal to or below a threshold distance, the subset of points is equal to or below a threshold number of points, and/or a change in error is below a threshold, the process 200 may advance to operation 252.

At operation 252, the process can include generating a correction function to correct errors (e.g., differences between actual parameters and estimated parameters) associated with the cameras. Though illustrated as a separate operation (here operation 252), such a correction function may comprise an output of the optimization performed at operation 250, above. Additionally, or alternatively, in at least some examples, such intrinsic and/or depth optimizations may be performed jointly or iteratively with extrinsic optimization, as discussed generally herein. Thus, for example, the process 100 and the process 200 may be performed simultaneously, and on the same images/point pairs, to provide robust sensor calibration. Moreover, some subset of the extrinsic calibration of the process 100, the depth optimizations and/or the estimated intrinsic parameters may be performed simultaneously and/or iteratively.

Because the process 200, like the process 100, relies only on image data comprising images captured substantially simultaneously, e.g., not on fiducial markers or other infrastructure, the process 200 can be implemented regardless of time or location. In some implementations, the process 200 can be implemented in real time, while the autonomous vehicle 204 is in operation. Thus, implementations described herein may correct for sensor calibration errors which may occur as intrinsic parameters change during operation, to promote improved sensor accuracy.

As described, both the process 100 and the process 200 may be iterative processes, i.e., in which a function is optimized for a set of points, points are removed from the set, the function is optimized for the subset, and so forth. Examples of determining the subset are discussed herein, and a specific example is illustrated by FIG. 3. More specifically, FIG. 3 illustrates a process 300 for filtering points, e.g., based on errors associated with those points. For example, the process 300 may be implemented to determine subsets of points, e.g., as in the operation 150 of the process 100 illustrated in FIG. 1. For example, techniques described herein may benefit from being optimized over the entire image, e.g., by ensuring that considered points are representative of the whole image. This may be particularly useful when calibrating cameras other than linear cameras, e.g., because non-linear cameras may have increased distortion errors at the image periphery and/or because matches are likely to be more prevalent at the center of the image.

At operation 302, the process 300 includes receiving data including points in an image and errors associated with those points. The visualization accompanying the operation 302 in FIG. 3 illustrates an image 304, which may be the first image 110(2) from FIG. 1. (Portions of the example of FIG. 3 are illustrated with reference to the examples of FIG. 1, although the process 300 may be equally applicable to the example of FIG. 2. For example, the image 304 may be the first image 208(1) (or the second image 208(2) from FIG. 2, for example.) The image 304 also includes representations of points and associated errors, visualized as point and epipolar line segment pairs. A number of pairs are illustrated, with specific pairs being numbered 306a, 306b, 306c, 306d, 306e, 306f, 306g, 306h, 306i, and 306j. More specifically a first pair 306a includes a first point and an epipolar line corresponding to the first point, as described herein, a second pair 306b includes a second point and an epipolar line corresponding to the second point, and so on. Herein, the plurality of pairs, whether or not labelled may be referred to as the pairs 306.

At operation 308, the process 300 can include segmenting the image into regions. For example, as illustrated in a visualization 310 accompanying the operation 308, the image 304 may be sectioned by one or more sectioning lines 312 into a plurality of regions 314a, 314b, 314c, 314d (hereinafter, collectively referred to as the regions 314). Thus, in the illustrated example, the sectioning lines 312 may form a grid that segments the image 304 into four equal quadrants. The illustrated sectioning is for example only, as more or fewer regions 314 may also be formed. Moreover, although the regions 314 are illustrated as having the same area, in other implementations, the regions 314 could have different sizes. As described further herein, the regions 314 may be considered independently when filtering data points, e.g., to allow for a full representation of points over the area of the image.

At operation 316, the process 300 can include determining a subset of points per region. For example, the points within each of the regions 312 may be considered separately from other regions. Viewing a visualization 318 accompanying the operation 316 in comparison with the visualization 310 illustrates this concept. More specifically, in the visualization 310, each of the regions 314a, 314b includes six point/error pairs 306 and each of the regions 314c, 314d includes three point/error pairs 306. In the visualization 318, two points have been removed from each of the regions 314a, 314b, and one point has been removed from each of the regions 314c, 314d. In this example, the removed points may be those pairs evidencing the greatest error within the region. As illustrated, 33% of the points have been filtered out per region 314. In at least some examples, the number of points filtered (removed) per region may differ so as to retain roughly similar numbers of points per region. In such an example, the points associated with the highest errors of each region may be removed so as to have the same total number of points per region as the region with the lowest number of points. As will be appreciated, filtering the top 33% of pairs 306 from the entire image 304 could result in a very different subset of points. For example, it could be possible that the 33% of the points with the greatest error correspond to the six pairs 306 in region 314a. Filtering out those points would leave no information about the top left quadrant of the image 304.

Accordingly, the segmenting techniques exemplified by the process 300 may result in retaining points that provide a good cross-section of the entire area of the image 304. For example, the process 300 may provide homogenous coverage across the entire image, which may be particularly useful when performing intrinsic calibration (e.g. by retaining similar number of points in outer portions of the image associated with greater distortion as compared to central portions of the image). Moreover, when using the subset of points shown in the visualization 318 to determine camera calibration as described herein, points in each of the regions 314 may be weighted differently. For example, because the regions 314a, 314b have twice the number of points as the regions 314c, 314d, points in the regions 314a, 314b may be weighted by a factor of 0.5 such that errors associated with those regions only contribute half as much as other regions. Such weighting factors may be chosen to optimize the information considered in determining one or more of the intrinsics, extrinsics, or point depths (e.g. based on the number of points, etc). The visualizations 310, 318 are for example only. As noted above, techniques described herein may include hundreds, if not thousands of points and associated errors. The weighting factors and the percentage of points to be removed may vary according to the application and other factors. Moreover, the disclosure is not limited to removing a percentage of points. For example, in some instances, points above an error threshold may be removed, and the threshold may be lower in regions that have fewer points. Moreover, the use of four regions 314 is for example only, as in many applications more regions will be provided.

Figure 4:
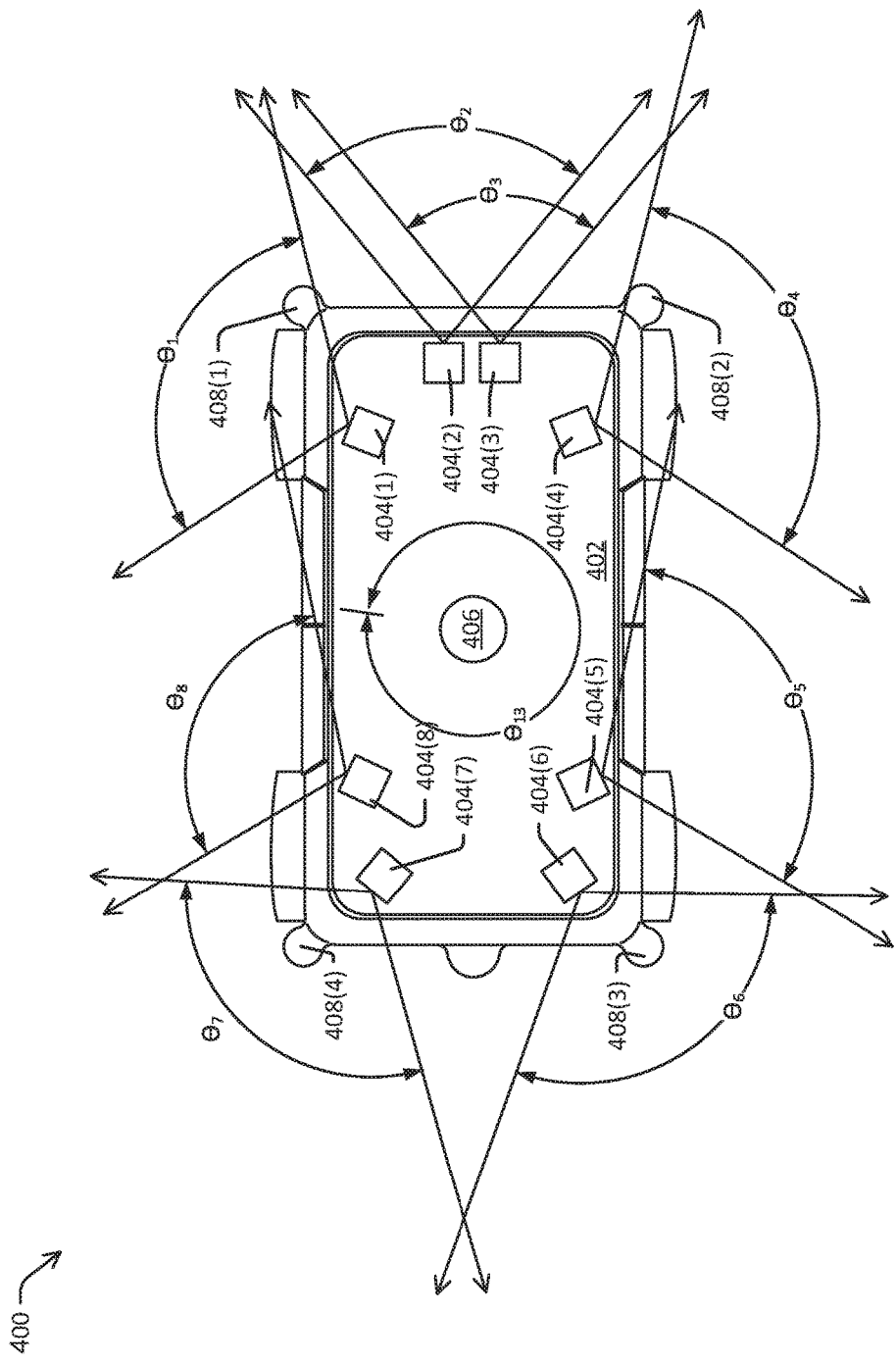
FIG. 4 is a top plan view of an example vehicle illustrating multiple sensors mounted on an example vehicle.

FIG. 4 illustrates an example top view 400 of an autonomous vehicle 402 that may be used in examples of this disclosure. More specifically, the vehicle 402 includes eight cameras 404(1), 404(2), 404(3), 404(4), 404(5), 404(6), 404(7), 404(8) (collectively, the cameras 404) mounted on a roof of the vehicle 402. The camera 404(1) may include a horizontal field of view $\theta_1$, the camera 404(2) may include a horizontal field of view $\theta_2$, the camera 404(3) may include a horizontal field of view $\theta_3$, the camera 404(4) may include a horizontal field of view $\theta_4$, the camera 404(5) may include a horizontal field of view $\theta_5$, the camera 404(6) may include a horizontal field of view $\theta_6$, the camera 404(7) may include a horizontal field of view $\theta_7$, and the camera 404(8) may include a horizontal field of view $\theta_8$. As configured, the cameras 404 are disposed at mounting locations such that adjacent cameras have overlapping fields of view, and in the aggregate the cameras 404 provide a full 360-degrees of vision about the vehicle 402. Because of this arrangement of the cameras 404, aspects of the process 100 can be applied across the entire array of cameras 404 to determine a relative alignment of all eight cameras 404 relative to each other (and relative to the vehicle. More specifically, the field of view $\theta_1$ of the camera 404(1) overlaps with the field of view $\theta_2$ of the camera 404(2) and with the field of view $\theta_8$ of the camera 404(8). Thus, first point pairs can be determined for images captured by the camera 404(1) and the camera 404(2), as well as for images captured by the camera 404(1) and the camera 404(8). As will be appreciated, the camera 404(1) may then be constrained relative to both the camera 404(2) and the camera 404(12). Similarly, the camera 404(2) may be constrained relative to the camera 404(1) (because the field of view $\theta_2$ overlaps with the field of view $\theta_1$) and relative to the camera 404(3) (because the field of view $\theta_2$ overlaps with the field of view $\theta_3$). (Moreover, because the field of view $\theta_2$ also overlaps with at least the field of view $\theta_4$, the camera 404(2) may also be fixed relative to the camera 404(4)). In some implementations, the techniques described herein may be used to determine a calibration function for the cameras relative to a point on the vehicle, e.g., a point on a central axis of the vehicle. As may be understood, the example arrangement of cameras 404 is but one example; more or fewer cameras with the similar or different arrangements may also benefit from techniques described herein. Moreover, although the top view 400 illustrates only horizontal fields of view, it may be understood that each of the cameras 404 also has a vertical field of view, and as described above, the techniques described herein can be used to account for misalignment according to six-degrees of freedom. Furthermore, although the cameras 404 are illustrated as being substantially identical, the cameras may be different types, e.g., with different shutter types, lens types, fields of view, or the like.

As also illustrated in FIG. 4, the vehicle 402 may include additional sensor assemblies. In some instances, the sensor assemblies may include, but are not limited to, one or more LIDAR sensors, radar sensors, image sensors, SONAR sensors, and the like. Additional examples of sensors are discussed herein (e.g., in connection with FIG. 5). In the example, the vehicle 402 may also include sensors 406, 408(1), 408(2), 408(3), 408(4) (with the sensors 408(1), 408(2), 408(3), 408(4) collectively referred to as the sensors 408). The sensor 406 may include a LIDAR sensor mounted on the roof of the vehicle 402, and the sensor 406 may have a horizontal field of view illustrated as $\theta_{13}$. Thus, as illustrated, the sensor 406 may have a 360-degree field of view, overlapping with the fields of view of the cameras 404. As discussed in more detail herein, lidar data (e.g., point cloud data) from the sensor 406 may be used in conjunction with image data, such as the images 110(1), 110(2) to constrain the cameras 404 relative to the vehicle 402. The sensors 408 may be other sensors (e.g., of different or the same modalities) mounted at the corners of the vehicles. For example, the sensors 408 may be radar sensors configured to provide additional information about the environment, which information may or may not be used in implementations described herein. As may be understood in the context of this disclosure, the mounting locations and fields of view may correspond to extrinsic characteristics and intrinsic characteristics, respectfully, which may be calibrated as described herein. Of course, any number and/or type of sensors can be mounted to or installed in the vehicle 402.

Figure 5:
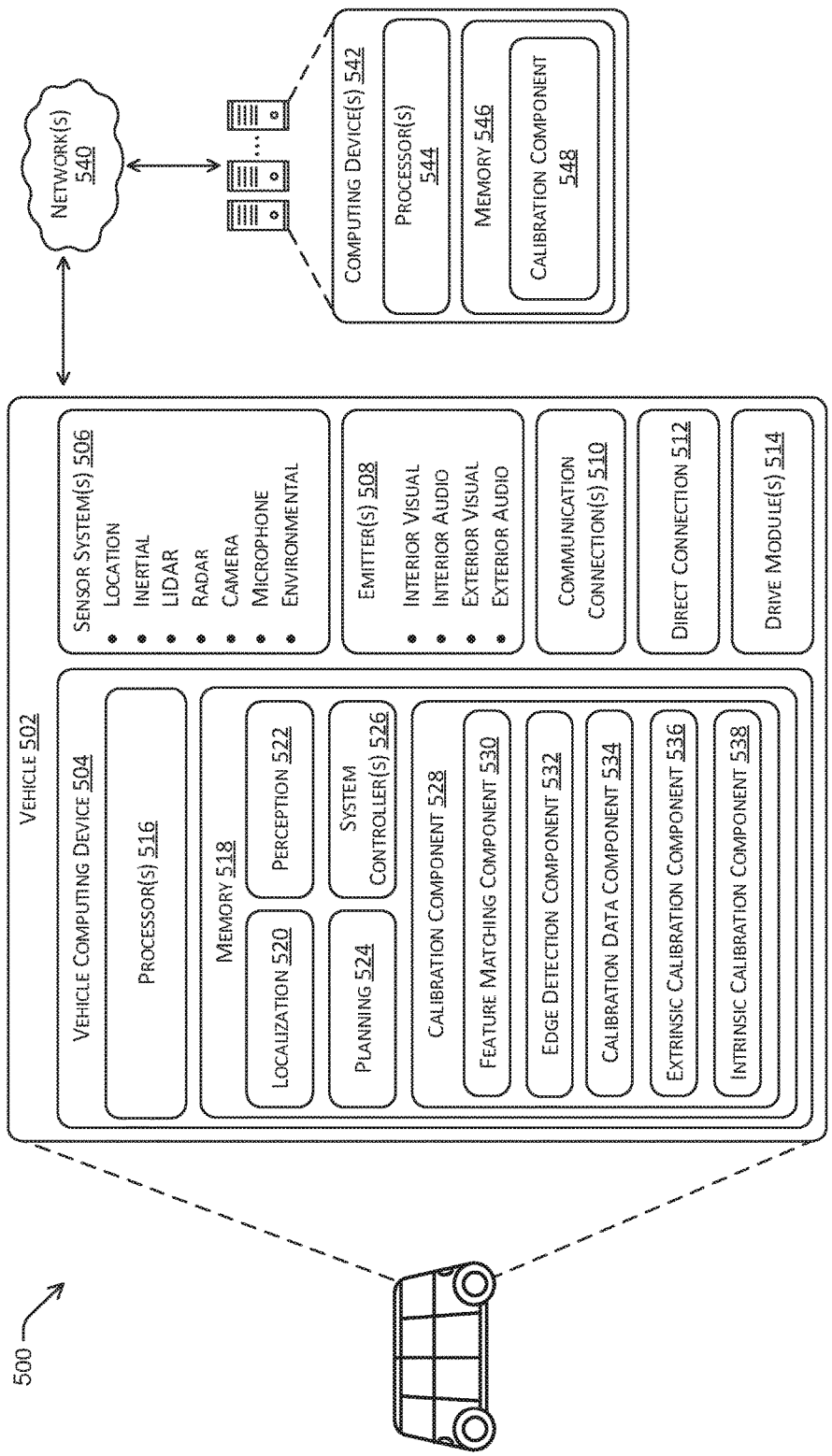
FIG. 5 is a block diagram of an example system for implementing embodiments of sensor calibration, as described herein.

FIG. 5 illustrates a block diagram of an example system 500 for implementing the techniques described herein. In at least one example, the system 500 can include a vehicle 502, which can be the same vehicle as the vehicle 104 or the vehicle 202 described above with reference to FIGS. 1 and 2, respectively.

The vehicle 502 can include a vehicle computing device 504, one or more sensor systems 506, one or more emitters 508, one or more communication connections 510, at least one direct connection 512, and one or more drive modules 514.

The vehicle computing device 504 can include one or more processors 516 and memory 518 communicatively coupled with the one or more processors 516. In the illustrated example, the vehicle 502 is an autonomous vehicle; however, the vehicle 502 can be any other type of vehicle. In the illustrated example, the memory 518 of the vehicle computing device 504 stores a localization component 520, a perception component 522, a planning component 524, one or more system controllers 526, and a calibration component 528. Further, the calibration component 528 can include a feature extraction component 530, an edge detection component 532, a calibration data component 534, an extrinsic calibration component 536, and an intrinsic calibration component 538. Though depicted in FIG. 5 as residing in memory 518 for illustrative purposes, it is contemplated that the calibration component 528 may additionally, or alternatively, be accessible to the vehicle 502 (e.g., stored remotely).

In at least one example, the localization component 520 can include functionality to receive data from the sensor system(s) 506 to determine a position of the vehicle 502. For example, the localization component 520 can include, request, and/or receive a three-dimensional map of an environment and can continuously determine a location of the autonomous vehicle within the map. In some instances, the localization component 520 can utilize SLAM (simultaneous localization and mapping) or CLAMS (calibration, localization and mapping, simultaneously) to receive image data, LIDAR data, radar data, SONAR data, IMU data, GPS data, wheel encoder data, and/or the like to accurately determine a location of the autonomous vehicle 502. In some instances, the localization component 520 can provide data to various components of the vehicle 502 to determine an initial position of the vehicle 502 for generating a candidate trajectory, or for correlating calibration operations, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, unknown, etc.). In additional and/or alternative examples, the perception component 522 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. For example, the planning component 524 can determine various routes and trajectories and various levels of detail. For example, the planning component 524 can determine a route to travel from a first location (e.g., a current location) to a second location (e.g., a target location).

For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In at least one example, the vehicle computing device 504 can include the one or more system controllers 526, which can be configured to control steering, propulsion, braking, safety, emitter, communication, and other systems of the vehicle 502. The system controller(s) 526 can communicate with and/or control corresponding systems of the drive module(s) 514 and/or other components of the vehicle 502.

In general, the calibration component 528 can include functionality to calibrate one or more sensors operating in connection with the vehicle 502. For example, the calibration component 528 can detect improperly calibrated sensors, schedule calibration routines, and send calibration data to one or more other components of the vehicle 502 that utilize data produced by the one or more sensors.

The feature matching component 530 can analyze corresponding images, e.g., images captured substantially simultaneously by cameras having overlapping fields of view, to determine corresponding features in the images. In some instances, the analysis of corresponding images may include feature extraction techniques, for example. Such features may comprise, for example, SURF, SIFT, AKAZE, ORB, BRIEF, FAST, FREAK, etc. features, though any other feature is contemplated. The feature matching component can identify point pairs as described in association with the process 100, described above. The point pairs may then be used by the extrinsic calibration component 536 or intrinsic calibration component 538, as described further herein.

The edge detection component 532 can analyze image data to determine feature edges. For example, the edge detection component 532 can apply a Canny edge detection algorithm to detect edges in images captured by cameras mounted on the vehicle 502. For example, in implementations described herein, edges detected by the edge detection component can be compared to point cloud data to obtain calibration information, e.g., to constrain calibrated cameras relative to the vehicle 502, as discussed below with reference to FIG. 5.

The calibration data component 534 can include functionality to store calibration data associated with one or more sensors of the vehicle 502. In some instances, the calibration data component 534 can store one or more calibration angles (or calibration characteristics, generally) associated with a sensor, such as calibration transforms for an array of cameras, as discussed above with respect to FIG. 1. In some instances, the calibration data can store mounting angles and/or positions of sensors and/or any extrinsic and/or intrinsic information associated with the one or more sensors, including but not limited to, calibration angles, mounting location, height, direction, yaw, tilt, pan, timing information, lens distortion parameters, transmission medium parameters, and the like. Further, the calibration data component 534 can store a log of some or all of the calibration operations performed, such as a time elapsed from the most recent calibration, and the like.

The extrinsic calibration component 536 can include functionality to determine a correction function to calibrate cameras of the sensor system(s) 506 relative to each other. In some examples, the extrinsic calibration component 536 can utilize epipolar geometry to compare points in corresponding (e.g., overlapping and/or captured at substantially the same time) images to compute a fundamental matrix that describes a relationship between the corresponding images. In some instances, the extrinsic calibration component 536 can also determine epipolar lines, e.g., from the fundamental matrix, and project epipolar lines corresponding with points in a first image onto a second image, e.g., to determine whether the points align.

The extrinsic calibration component 536 can also reduce the set of point pairs to be considered, e.g., by removing outliers and noise. In some examples, the extrinsic calibration component 536 may determine a projection error using the epipolar lines, and point pairs having an error (e.g., a distance between a point and an epipolar line) equal to or above a threshold error may be excluded from the set of point pairs. The extrinsic calibration component 536 can then determine a correction function based on the subset of point pairs.

In addition to performing image-to-image comparisons, e.g., to determine a correction function to correct misalignment between cameras, the extrinsic calibration component 536 can also perform lidar-to-camera analysis. As discussed above, the epipolar geometry-based calibration techniques described herein may be used to calibrate cameras relative to each other, however additional techniques may be necessary to constrain the cameras relative to the vehicle on which they are mounted. One technique, discussed in more detail below in conjunction with FIG. 5, may include comparing LIDAR data to image data to constrain the final degree-of-freedom that the process 100 alone is unable to constrain.

The intrinsic calibration component 538 can include functionality to determine a correction function to calibrate intrinsic characteristics, e.g., focal length, point depth, center potion and distortion parameters, of cameras of the sensor system(s) 506. In some examples, the intrinsic calibration component 538 can re-project points in corresponding (e.g., overlapping, captured at substantially the same time, and/or capturing the same region of the environment at subsequent times) images to estimate point depths between the corresponding images. In some instances, the extrinsic calibration component 536 can also compare actual, measured points to undistorted points, e.g., to account for distortion parameters.

The intrinsic calibration component 538 can also reduce the set of point pairs to be considered, e.g., by removing outliers and noise. In some examples, the intrinsic calibration component 538 may determine a re-projection error using the re-projected points and estimates of point depth, with point pairs having an error (e.g., a distance between a point and re-projected point) equal to or above a threshold error may be excluded from the set of point pairs. The intrinsic calibration component 534 can then determine a correction function based on the subset of point pairs, e.g., by optimizing a correction matrix using the subset of point pairs.

In some instances, the extrinsic calibration component 536 and the intrinsic calibration component 538 can perform operations in parallel. For example, a first correction function associated with camera-to-camera alignment can be determined using epipolar geometry principles, a second correction function associated with camera(s)-to-vehicle alignment can be determined using LIDAR-to-image data principles, and/or a third correction function associated with an intrinsic alignment of one or more cameras can be determined in parallel using a processor, such as a GPU, to reduce an amount of processing time for the calibration operations discussed herein.

In some instances, aspects of some or all of the components discussed herein may include any models, algorithms, and/or machine learning algorithms. For example, in some instances, the components in the memory 518 (and memory 546, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 can include LIDAR sensors, radar sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the LIDAR sensors (and/or radar sensors) can include individual LIDAR sensors (or radar sensors) located at the corners, front, back, sides, and/or top of the vehicle 502. As another example, the camera sensors can include multiple cameras (such as the cameras 206) disposed at various locations about the exterior and/or interior of the vehicle 502. The sensor system(s) 506 can provide input to the vehicle computing device 504. Additionally, or alternatively, the sensor system(s) 506 can send sensor data, via one or more networks 540, to the one or more computing device(s) at a particular frequency, after a lapse of a predetermined period of time, in near real-time, etc.

The vehicle 502 can also include one or more emitters 508 for emitting light and/or sound. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive module(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as the network(s) 538. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive modules 514. In some examples, the vehicle 502 can have a single drive module 514. In at least one example, if the vehicle 502 has multiple drive modules 514, individual drive modules 514 can be positioned on opposite ends of the vehicle 502 (e.g., the front and the rear, etc.). In at least one example, the drive module(s) 514 can include one or more sensor systems to detect conditions of the drive module(s) 514 and/or the surroundings of the vehicle 502. By way of example and not limitation, the sensor system(s) 506 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 514. In some cases, the sensor system(s) on the drive module(s) 514 can overlap or supplement corresponding systems of the vehicle 502 (e.g., sensor system(s) 506).

The drive module(s) 514 can include many of the vehicle systems, including a high voltage battery, a motor to propel the vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 514. Furthermore, the drive module(s) 514 also include one or more communication connection(s) that enable communication by the respective drive module with one or more other local or remote computing device(s).

The processor(s) 516 of the vehicle 502 can be any suitable processor capable of executing instructions to process data and perform operations as described herein. By way of example and not limitation, the processor(s) 516 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 is an example of non-transitory computer-readable media. The memory 518 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with remote computing devices accessible via the network(s) 540.

For example, the vehicle 502 can send sensor data to one or more computing device(s) 542, via the network(s) 540. In some examples, the vehicle 502 can send raw sensor data to the computing device(s) 542. In other examples, the vehicle 502 can send processed sensor data and/or representations of sensor data to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can receive the sensor data (raw or processed) and can perform calibration operations on the data. In at least one example, the computing device(s) 542 can include one or more processors 544 and memory 546 communicatively coupled with the one or more processors 544. In the illustrated example, the memory 546 of the computing device(s) 542 stores a calibration component 548, which can include functionality to perform operations similar to those discussed above in the context of the calibration component 528. In some instances, the processor(s) 544 and the memory 546 can include functionality and/or structure similar to that discussed above with respect to the processor(s) 516 and the memory 518.

FIGS. 1, 2, 3, 6, 7, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
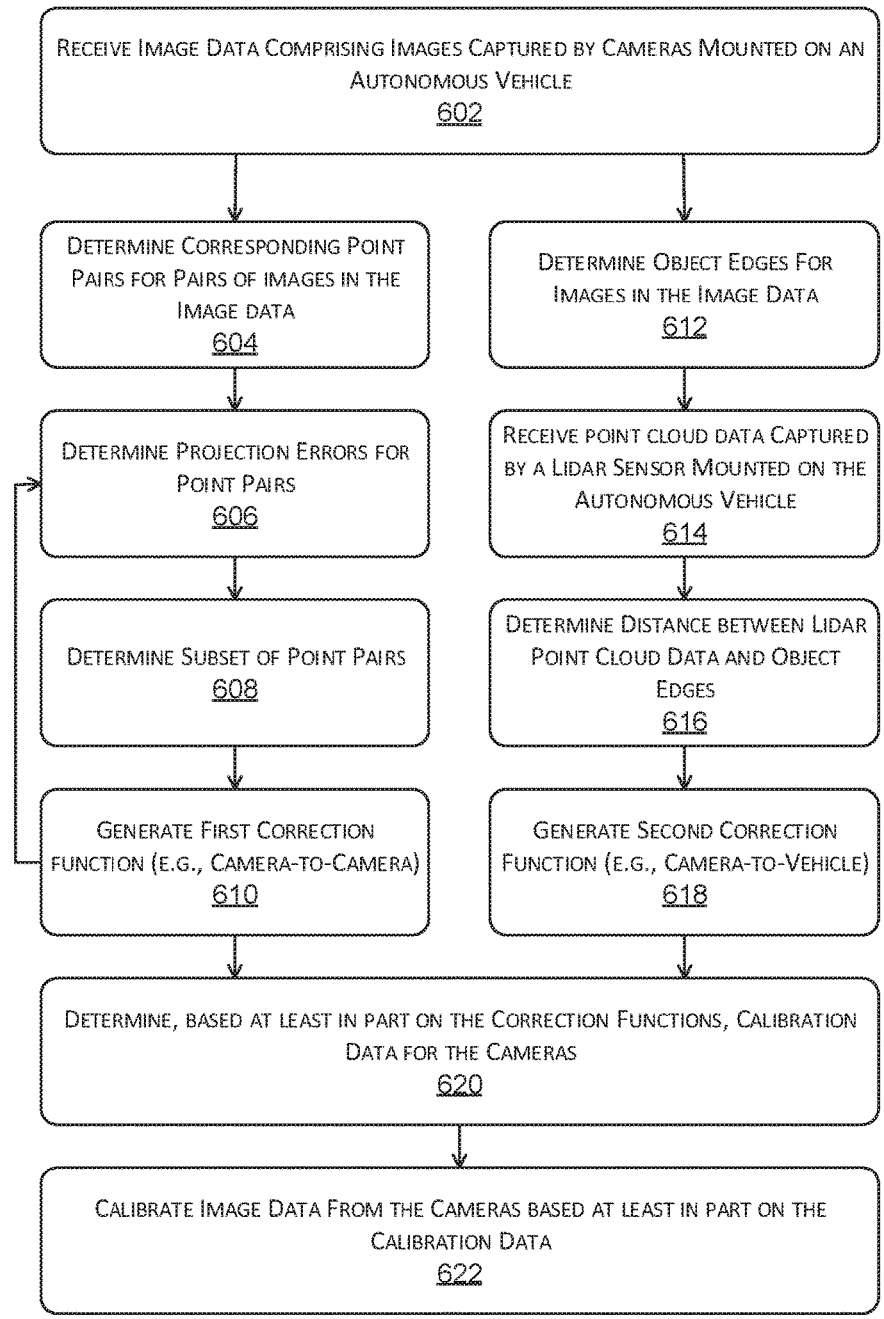
FIG. 6 is an example process for calibrating sensors using camera-to-camera calibration and camera-to-sensor calibration, in accordance with implementations described herein.

FIG. 6 depicts an example process 500 for calibrating extrinsic characteristics of one or more cameras. For example, some or all of the process 500 can be performed by one or more components in FIG. 5, as described herein. For example, some or all of the process 500 can be performed by the calibration components 528 and/or 548.

At operation 602, the process can include receiving image data comprising images captured by cameras mounted on an autonomous vehicle. In some examples, the images may be captured by cameras having overlapping fields of view, and the images may be acquired as the vehicle moves through the environment. In some examples, the data may comprise a video feed comprising a succession of frames, each comprising an image captured at a discrete time. In some examples, the cameras may be arranged on the vehicle to capture images of the environment for a full 360-degrees around the vehicle. In these examples, adjacent cameras may have overlapping fields of view.

At operation 604, the process can include determining corresponding point pairs for pairs of images in the image data. For example, the process may analyze the image data to identify image features and match those features across images. In some instances, the operation 604 can determine the corresponding point pairs using feature extraction and/or feature matching techniques. More specifically, the operation 604 may identify a point in a first image captured by a first camera and a second point in a second image captured by a second camera at substantially the same time as the first image (and/or first and second points in subsequent image data captured by one or more sensors). The first point and the second point may identify the same image feature in the two images. For example, the operation 604 may identify hundreds of point pairs for each image pair captured by the first camera and the second camera. Moreover, the operation 604 may determine hundreds of point pairs for thousands of image pairs. In some implementations, for each pair of cameras with overlapping fields of view, up to about 20000 frames (e.g., discrete images) for each camera may be considered, and up to about 300 point pairs may be determined for each pair of images.

At operation 606, the process can include determining errors (e.g., projection errors) for each of the point pairs. In some instances, the operation 606 can determine a fundamental matrix that describes the relationship between the cameras and based on an initial assumption of the relative poses. Using the fundamental matrix, the operation 606 may determine epipolar lines for first points in the point pair, and project those epipolar lines into the second image. The errors may be determined as a distance between the epipolar lines and the second points.

At operation 608, the process 600 may determine a subset of point pairs. For instance, the subset of point pairs may exclude points having an error equal to or above a threshold error. In some implementations, the subset may also be determined based on a position of the points in the image. For instance, the operation 608 may include a bias to retain points that provide a complete representation of the entirety of the overlapping field of view. Thus, for example, a first point having a relatively higher error may be retained over a second point having a relatively lower error when the first point is further from an adjacent point, e.g., an adjacent point having a higher error. In at least some examples, such a subset may further be determined based on the reverse, i.e. determining epipolar lines of second points in the first image and determining errors of the first points relative to projections of the second points. Such a left-right consistency check may additionally reduce the amount of outliers.

From operation 608, the process 600 can return to operation 606. For example, the process 600 may iteratively solve for the fundamental matrix, determine errors associated with the points pairs, and then refine the set of point pairs. In some implementations, the number of iterations may be pre-established. In other implementations, the process 600 can continue to operation 610 when the set of point pairs is equal to or below a threshold number of point pairs, e.g., fewer than 20 point pairs, where a total error of the points stops declining, declines by a threshold amount, or the likes.

The operation 610 can include generating a first correction function. For example, the first correction function solved using epipolar geometry for all cameras can yield a calibration of all cameras with respect to each other. However, as discussed above, the cameras are not constrained in all six degrees of freedom because the techniques utilizing epipolar geometry do not consider depth of the points in the point pairs.

Accordingly, the process 600 may also include operations to constrain the sixth degree of freedom and/or provide an indication of scale. For instance, the operations 612, 614, 616, and 618 may compare lidar data, e.g., point cloud data generated by a lidar sensor, to image data captured by cameras, to constrain the cameras relative to the vehicle (e.g., a point on the vehicle).

For example, the operation 612 may determine object edges for images in the image data. For instance, for each image (including each of the images analyzed at operation 604) an edge detection algorithm, such as a Canny edge detection algorithm, may be applied to determine edges in the images. Edge detection may also include applying a distance transform to pixels in the image, e.g., to quantify for each pixel in the image a straight-line distance (i.e. Euclidian distance) to the nearest edge pixel.

The operation 614 receives point cloud data captured by one or more lidar sensors mounted on the autonomous vehicle. For example, the lidar data may be captured for a field of view overlapping with a field of view of at least one of the cameras. In some examples, i.e. those examples where multiple lidar sensors are used, the combined output of multiple lidar sensors may comprise a "meta-spin," such that the multiple lidar sensors may effectively be treated as a single lidar sensor. In those examples where multiple lidar sensors are used, additional calibration steps may be performed with respect to the lidar sensors themselves such that the lidar sensors are well calibrated to each other. Such calibrations are described, for example, in U.S. patent application Ser. No. 15/674,853 filed on Aug. 11, 2017 entitled "Vehicle Sensor Calibration and Localization" and U.S. patent application Ser. No. 15/675,487 filed on Aug. 11, 2017 and entitled "Sensor Perturbation", the entire contents of which are hereby incorporated by reference. As described above, in a well-calibrated system, lidar data should align with image data. Such information is used in subsequent operations, described in detail below, to calibrate the image sensors (cameras) with the lidar sensor.

At operation 616, the process 600 may determine a distance between points in the lidar point cloud data and object edges. For example, when lidar returns corresponding to a time are projected onto camera images captured at that time, lidar points with strong depth discontinuity in the point cloud neighborhood should reliably fall onto image edges. The distance between the points in the point cloud and the object edges may be associated with an error in the calibration of the lidar sensor relative to the cameras.

More specifically, techniques described herein may select lidar points at depth discontinuities using a simple filter, e.g., a [1 0 −1], filter on the depth measurement per horizontal lidar beam. A threshold may be applied to this result (e.g., depth discontinuities must be at least 10 cm, 1 m, 10 m, or the like). Also, according to example implementations, techniques described herein may project each selected lidar point onto an image and score each of the projected points based on the pixel value of the transformed edge image (e.g., discussed above in connection with the operation 614, which may be bi-linearly interpolated) on which it falls. Thus, the score may indicate how far each point lies from the nearest image edge. In some implementations, the distance transformed map may also be truncated to limit the influence of false positives (e.g., strong image edges that do not represent depth discontinuities, including road markings and writing on street signs) and/or false negative (e.g., depth discontinuities that do not show up as image edges. In the techniques described herein, an extrinsic calibration of the lidar, a vehicle pose at the lidar time, a vehicle pose at the camera time, and/or the camera intrinsics may be fixed parameters, with camera extrinsics being the only free parameter.

At operation 618, the process 600 generates a second correction function. For example, the operation 618 uses the error exemplified by the distance between points in the point cloud and the image edges to determine a correction function (e.g., as a calibration matrix) to constrain the cameras capturing the image data relative to the vehicle. Thus, comparing lidar data to the camera images as described herein may constrain the sixth-degree of freedom of the cameras, to provide a complete calibration function for the array of cameras. Implementations of this disclosure may assume that the lidar data is well-calibrated, e.g., that the lidar sensor is correctly calibrated relative to the vehicle.

At operation 620, the process can include determining, based at least in part on the first correction function and the second correction function, calibration data associated with the one or more cameras. For example, the first correction function may constrain five of the six degrees of freedom of an array of cameras on the vehicle and the second correction function can constrain the sixth degree of freedom. Although for clarity of discussion, the process 600 describes generating a first correction function at operation 610, generating a second correction function at 618, and then generating the calibration data from the two correction functions at operation 620, in implementations, the process 600 may perform several of the operations in parallel, e.g., to solve for the calibration data from the image data and the lidar data. The calibration data may include a calibration transform or matrix that can be applied to image data captured subsequently at the cameras. In some instances, the operation 620 can include determining one or more calibration angles (or calibration characteristics, generally), for example, by adding or subtracting an adjustment angle from a reference angle to determine the optimal calibration data.

For example, in implementations of this disclosure, techniques may optimize for correct pose (i.e., position and orientation) of all cameras jointly over all camera-to-camera constraints (e.g., according to the operations 604, 606, 608, 610) and lidar-to-camera constrains (e.g., according to the operations 612, 614, 616, 618). For example, a Ceres framework may be used. Moreover, techniques described herein may be optimized to account for outliers and noise. For example, image feature matching may result in outliers, and an expectation maximization framework may be used to optimize results relative to such outliers in the camera image processing. For example, the expectation maximization framework may iterate between optimizing for the best camera poses, given the data support, and limiting the data support given the best estimate of the camera poses. Lidar data may be noisy, since lidar returns will not fall exactly on depth discontinuities. Instead, such returns will fall, on average, half the horizontal beam angle difference away from such discontinuities. This noise may be random and not systematic, and techniques used herein may adopt a loss function, such as the Huber loss function, for added robustness.

As between the camera-to-camera techniques and the lidar-to-camera techniques, both cost functions may measure error in pixels, but an amount of data, e.g., feature matches and lidar points, may differ. In some implementations, a linear scaling factor may be applied between both cost functions.

At operation 622, the process can include calibrating the one or more sensors based at least in part on the calibration data. For example, the operation 622 can include sending the calibration data to one or more of a localization system (e.g., the localization component 520), a perception system (e.g., the perception component 522), and the like. In some instances, the calibration data can be used by one or more systems of the vehicle to align or otherwise adjust data captured by the one or more sensors so that the data can represent the environment in an accurate manner.

Figure 7:
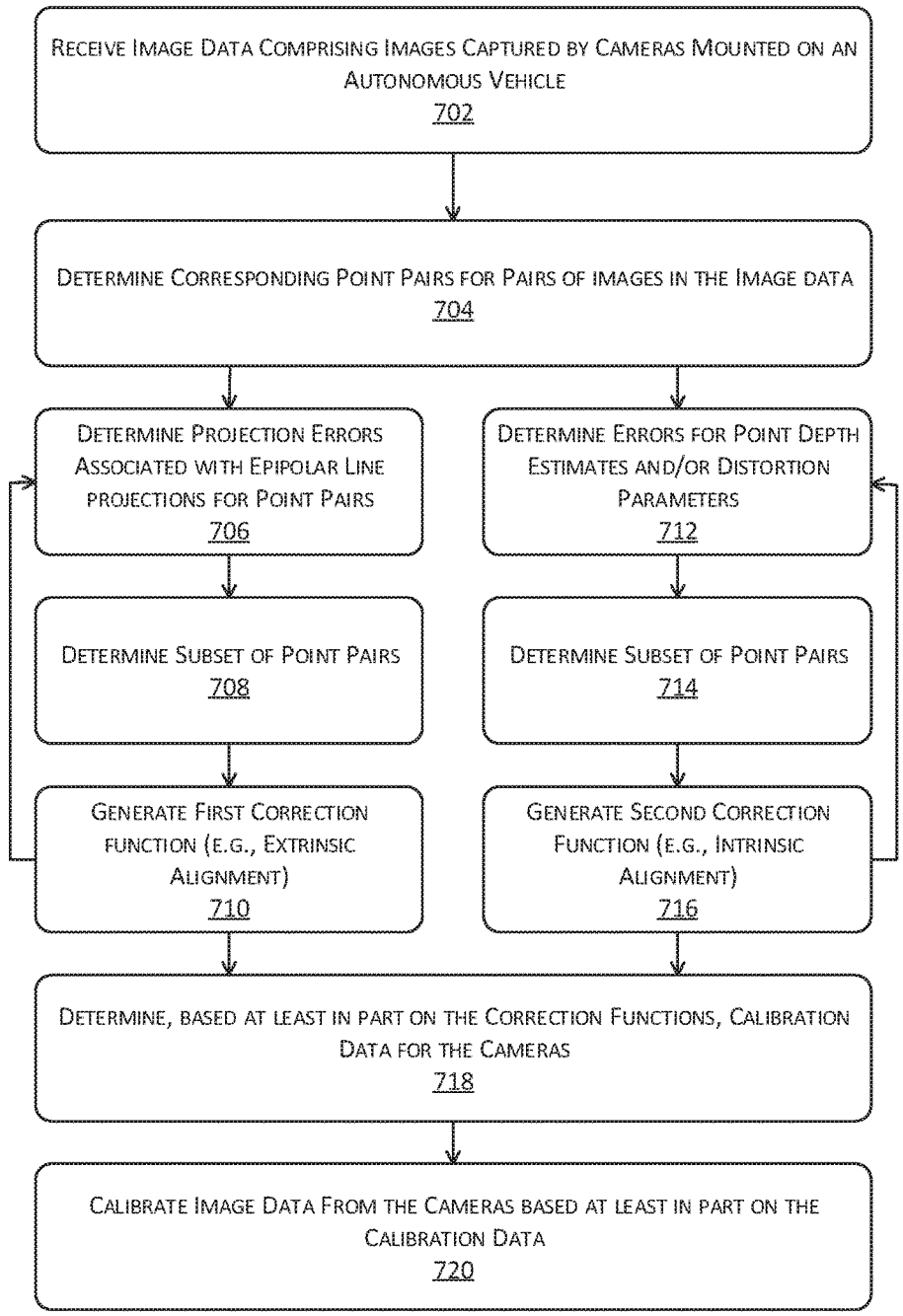
FIG. 7 is an example process for calibrating intrinsic characteristics of sensors, in accordance with implementations described herein.

FIG. 7 depicts an example process 700 for calibrating both extrinsic and intrinsic characteristics of one or more cameras. For example, some or all of the process 700 can be performed by one or more components in FIG. 5, as described herein. For example, some or all of the process 700 can be performed by the calibration components 528 and/or 548.

At operation 702, the process can include receiving image data comprising images captured by cameras mounted on an autonomous vehicle. In some examples, the images may be captured by cameras having (at least partially) overlapping fields of view, and the images may be acquired as the vehicle moves through the environment. In some examples, the data may comprise a video feed comprising a succession of frames, each comprising an image captured at a discrete time. In some examples, the cameras may be arranged on the vehicle to capture images of the environment for a full 360-degrees around the vehicle. In these examples, adjacent cameras may have overlapping fields of view. In additional examples, the images may be captured by a single camera, e.g., they may be images captured by the camera at different times. Implementations described herein may be used on any images that have the same features, e.g., images for which corresponding features may be determined. Similarly, so long as the images depict the same features, more than two images may be used, e.g., to enhance robustness.

At operation 704, the process can include determining corresponding point pairs for images in the image data. For example, the process may analyze the image data to identify image features and match those features across two or more images. As a non-limiting example, features may be determined for two frames for each camera (e.g., for each of two cameras) and feature matching may be performed across all frames (in this example, four), though any number of frames is contemplated. In such examples, feature matching across multiple frames from a video sequence may provide more robust features, resulting in better calibration. In any of the operations described in detail below, features may correspond to any of the features of the various frames captured. In some instances, the operation 704 can be substantially the same as the operation 604, and will not be detailed further herein.

At operation 706, the process can include determining errors (e.g., projection errors) for each of the point pairs. In some instances, the operation 706 can determine a fundamental matrix that describes the relationship between the cameras and based on an initial assumption of the relative poses. Using the fundamental matrix (e.g. by initializing with an estimated fundamental matrix), the operation 706 may determine epipolar lines for first points in the point pair, and project those epipolar lines into the second image. The errors may be determined as a distance between the epipolar lines and the second points.

At operation 708, the process 700 may determine a subset of point pairs. For instance, the subset of point pairs may exclude points having an error equal to or above a threshold error. In some implementations, the subset may also be determined based on a position of the points in the image. For instance, the subset may be determined using techniques discussed above in operation 608 and/or based on the techniques illustrated in FIG. 3.

The operation 710 can include generating a first correction function. For example, the first correction function solved using epipolar geometry for all cameras can yield a calibration of all cameras with respect to each other (e.g., as a correction to an initial estimate of extrinsic calibration). However, as discussed above, the cameras are not constrained in all six degrees of freedom because the techniques utilizing epipolar geometry do not consider depth of the points in the point pairs. Moreover, the techniques utilizing the epipolar geometry do not account for intrinsic parameters.

From operation 710, the process 700 can return to operation 706. For example, the process 700 may iteratively solve for the fundamental matrix, determine errors associated with the points pairs, and then refine the set of point pairs. In some implementations, the number of iterations may be pre-established. In other implementations, the process 700 can continue to operation 718 when the set of point pairs is equal to or below a threshold number of point pairs, e.g., fewer than 20 point pairs, where a total error of the points stops declining, declines by a threshold amount, where a change (derivative) of the error is less than a threshold amount, or the like.

Accordingly, the process 700 may also include operations to constrain the sixth degree of freedom, provide an indication of scale, and/or solve for misalignment associated with intrinsic parameters. For instance, the operations 712, 714, and 716 may generate a correction function associated with intrinsic parameters.

Further, in at least some examples, such a system may treat each scanline of an image independently (e.g. having an independent relative pose), wherein each scanline is associated with a different relative timestamp. As a non-limiting example, such treatment may be used where such cameras are rolling shutter cameras (i.e. wherein each scanline is captured successively) such that the resultant correction is based on a pose associated with each scanline.

For example, the operation 712 may determine errors associated with point depth estimates and/or intrinsics (e.g., distortion parameters). For instance, and as detailed above with regard to FIG. 2, points from a first image may be re-projected into a second image to determine depth of the points, e.g., by estimating the depth and converging on an optimized depth using information from a plurality of points. In this example, an error associated with the depth may be a Euclidian distance between the measured point and the re-projected point. The operation 712 may also solve for other intrinsic characteristics, e.g., distortion parameters, focal length, and center point, e.g., by determining undistorted points associated with each measured point.

At operation 714, the process 700 may determine a subset of point pairs. For instance, the subset of point pairs may exclude points having an error equal to or above a threshold error. In some implementations, the subset may also be determined based on a position of the points in the image. For instance, the subset may be determined using techniques discussed above in operation 608, 708 and/or based on the techniques illustrated in FIG. 3.

The operation 716 can include generating a second correction function (e.g., a function to correct for an initial assumption of camera intrinsics). For example, the second correction function solved using re-projection of points to determine point depths and/or using undistorted points can yield a calibration of intrinsic functions of individual cameras. As such, while the first correction function may not constrain all six degrees of freedom of the cameras, e.g., because the techniques utilizing epipolar geometry do not consider depth of the points in the point pairs, the second correction function may constrain all degrees of freedom, while optimizing for depth of points. Moreover, the second correction function may be optimized for other intrinsic parameters. As with operation 710, in at least some examples, each scanline (e.g., when a camera is a rolling camera) may be associated with a unique pose and/or timestamp for optimization.

From operation 716, the process 700 can return to operation 712. For example, the process 700 may iteratively solve for the intrinsic parameters, determine errors associated with the points pairs, and then refine the set of point pairs. In some implementations, the number of iterations may be pre-established. In other implementations, the process 700 can continue to operation 716 when the set of point pairs is equal to or below a threshold number of point pairs, e.g., fewer than 20 point pairs, where a total error of the points stops declining, declines by a threshold amount, when a rate of change of the error is below a threshold amount, or the like.

At operation 720, the process can include determining, based at least in part on the first correction function and/or the second correction function, calibration data associated with the one or more cameras. For example, the first correction function may constrain five of the six degrees of freedom of an array of cameras on the vehicle and the second correction function can constrain the sixth degree of freedom. Moreover, the second correction function can constrain the intrinsic parameters. Although for clarity of discussion, the process 700 describes generating a first correction function at operation 710, generating a second correction function at 716, and then generating the calibration data from the two correction functions at operation 718, in implementations, the process 700 may perform several of the operations in parallel, e.g., to solve for the extrinsic calibration data and the intrinsic calibration data from the same image data and at the same time (e.g., a joint optimization). The calibration data may include a calibration transform or matrix that can be applied to image data captured subsequently at the cameras. In some instances, the operation 718 can include determining one or more calibration angles (or calibration characteristics, generally), for example, by adding or subtracting an adjustment angle from a reference angle to determine the optimal calibration data. In some instances, the operations may be performed iteratively. For example, the process may alternate between solving the intrinsics and extrinsics until convergence.

For example, in implementations of this disclosure, techniques may optimize for correct pose (i.e., position and orientation) and for intrinsic parameters of all cameras jointly over all constraints. Moreover, techniques described herein may be optimized to account for outliers and noise. For example, image feature matching may result in outliers, and an expectation maximization framework may be used to optimize results relative to such outliers in the camera image processing. For example, the expectation maximization framework may iterate between optimizing for the best camera poses, given the data support, and limiting the data support given the best estimate of the camera poses.

At operation 720, the process can include calibrating the one or more sensors based at least in part on the calibration data. For example, the operation 720 can include sending the calibration data to one or more of a localization system (e.g., the localization component 520), a perception system (e.g., the perception component 522), and the like. In some instances, the calibration data can be used by one or more systems of the vehicle to align or otherwise adjust data captured by the one or more sensors so that the data can represent the environment in an accurate manner.

Figure 8:
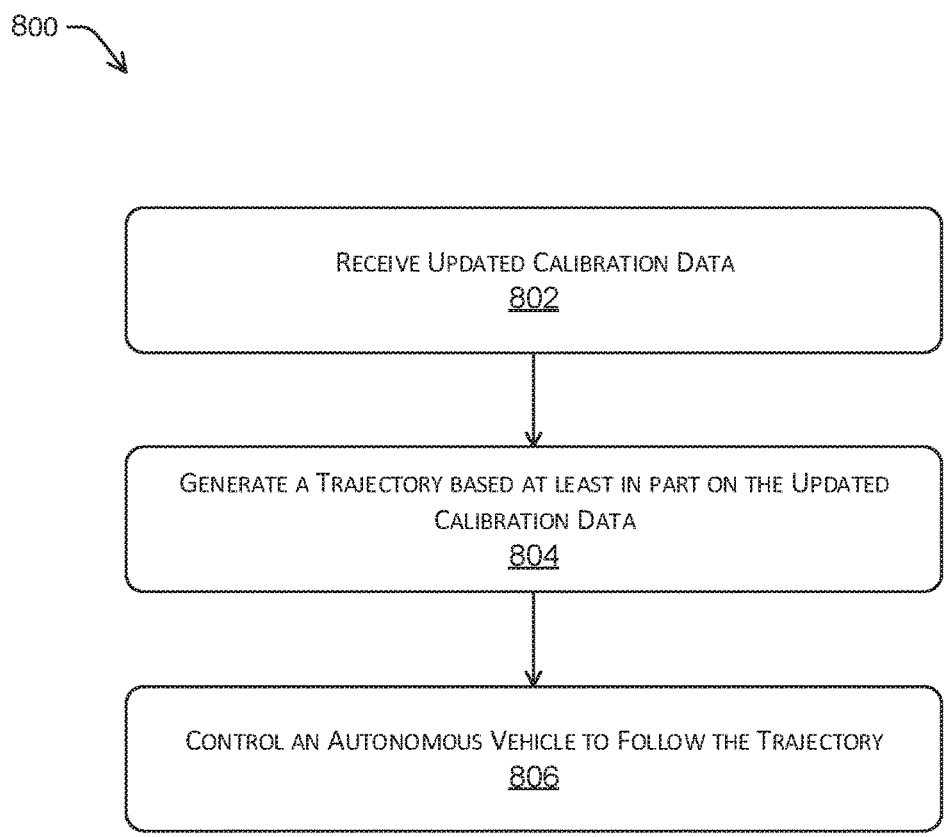
FIG. 8 is another example process for controlling an autonomous vehicle based at least in part on calibrated sensor data, in accordance with implementations described herein.

FIG. 8 depicts an example process 800 for controlling an autonomous vehicle based at least in part on calibrated sensor data, as discussed herein. For example, some or all of the process 800 can be performed by one or more components in FIG. 5, as described herein. For example, some or all of the process 800 can be performed by the localization component 520, the perception component 522, the planning component 524, and/or the one or more system controllers 526.

At operation 802, the process can include receiving updated calibration data. In some instances, the calibration data can be determined using the calibration techniques discussed herein.

At operation 804, the process can include generating a trajectory based at least in part on the updated calibration data. For example, the trajectory generated in the operation 804 may be based at least in part on sensor data received from one or more sensors calibrated using the calibration data. In some instances, the trajectory can be based on a presence of objects or agents external to an autonomous vehicle in an environment.

At operation 806, the process can include controlling an autonomous vehicle to follow the trajectory. In some instances, the commands generated in the operation 806 can be relayed to a controller onboard an autonomous vehicle to control the autonomous vehicle to drive the trajectory. Although discussed in the context of an autonomous vehicle, the process 800, and the techniques and systems described herein, can be applied to a variety of systems utilizing machine vision.

Example Clauses

A: An example system includes: a vehicle configured to traverse through an environment, the vehicle comprising: a plurality of cameras disposed on a body of the vehicle such that fields of view of at least two of the cameras at least partially overlap; one or more processors; and computer-readable media storing instructions executable by the one or more processors, wherein the instructions cause the system to perform operations comprising: receiving a set of images from the plurality of cameras, the set of images comprising images representing the environment at substantially a first time and captured by the plurality of cameras, determining, for the set of images, a plurality of point pairs, each of the point pairs comprising a first point in one of the images of the set of images and a second point in another of the images of the set of images, the first point and the second point corresponding to a same image feature; determining first errors associated with the plurality of point pairs, the first errors comprising, at least in part, a first distance between the first point and an epipolar line corresponding to the second point; determining, based at least in part on the first errors, a first subset of the plurality of point pairs; determining, from the first subset of the plurality of point pairs, a first correction function representative of a misalignment of an estimated relative pose of the cameras; determining second errors associated with the plurality of point pairs, the second errors comprising, at least in part, a second distance between the first point and a re-projection of the second point estimating a point depth; determining, based at least in part on the second errors, a second subset of the plurality of point pairs; determining, from the second subset of the plurality of point pairs, a second correction function representative of a misalignment of an estimated relative pose of the cameras; calibrating the plurality of cameras, based at least in part on the first correction function and the second correction function.

B: The system of example A, wherein the determining the first errors comprises: determining a fundamental matrix which describes a relationship between the one of the images and the other of the images; determining, for individual point pairs of the plurality of point pairs and based at least in part on the fundamental matrix, the epipolar line corresponding to the second point in the first image, and comparing the first point to the epipolar line in the first image.

C: The system of example A or example B, wherein determining the second error comprises undistorting the first point according to a camera intrinsic.

D: The system of any one of example A through example C, wherein at least one of the determining the first subset of the plurality of point pairs or the determining the second subset of the plurality of point pairs comprises: dividing an image of the set of images containing the first points and at least one of the epipolar lines or the re-projections into a plurality of regions; and determining a subset of point pairs for individual of the plurality of regions, wherein the first subset of the plurality of point pairs or the second subset of the plurality of point pairs comprises the subset of point pairs for the plurality of regions.

E: The system of any one of example A through example D, wherein the vehicle is an autonomous vehicle, the one or more computer-readable media storing further instructions executable by the one or more processors, wherein the further instructions cause the system to perform operations comprising: calibrating, based at least in part on the calibration function, additional image data received from the plurality of cameras as calibrated data; generated, based at least in part on the calibrated data, a trajectory to control the autonomous vehicle; and controlling the autonomous vehicle based at least in part on the trajectory.

F: An example method includes: receiving first image data comprising a first image of an environment captured by a first camera disposed on a system, the first camera having a first field of view; receiving second image data comprising a second image of the environment captured by a second camera disposed on the system, the second camera having a second field of view at least partially overlapping the first field of view; determining a plurality of point pairs, a point pair of the plurality of point pairs comprising a first point in the first image and a second point in the second image corresponding to the first point; determining first errors for individual point pairs of the plurality of point pairs, the first errors comprising, at least in part, a distance between the first point and an epipolar line corresponding to the second point in the first image; determining second errors for individual point pairs of the plurality of point pairs, the second errors comprising, at least in part, a distance between the first point and a reprojection of the corresponding second point, the reprojection based at least in part on an estimated depth of the first point; determining, based at least in part on at least one of the first errors or the second errors, a subset of the plurality of point pairs; and determining, from the subset of the plurality of point pairs, a calibration function representative of at least one of an estimated relative pose of the first camera and the second camera or an estimated camera intrinsic of the first camera or the second camera.

G: The method of example F, wherein the determining the first errors comprises: determining a fundamental matrix; determining, for the point pair of the plurality of point pairs and based at least in part on the fundamental matrix, the epipolar line corresponding to the second point, projecting the epipolar line in the first image, and determining a distance between the first point and the epipolar line in the first image.

H: The method of example F or example G, wherein the determining the plurality of point pairs comprises: extracting a plurality of first features from the first image; extracting a plurality of second features from the second image; matching, as matched features, first features from the first plurality of features and second features of the second plurality of features; and determining, as the plurality of point pairs, a plurality of pixels associated with the matched features, wherein the plurality of first features and the plurality of second features comprise one or more of FREAK, AKAZE, FAST, SURF, SIFT, ORB, or BRIEF features.

I: The method of any one of example F through example H, wherein the reprojection is further based on undistorting the first point based, at least in part, on the estimated camera intrinsic of the first camera.

J: The method of any one of example F through example I, wherein the determining the subset of the plurality of point pairs comprises: dividing the first image containing the first points into a plurality of regions; and determining, based at least in part on the first errors or the second errors, a subset of point pairs for a region of the plurality of regions, wherein the first subset of the plurality of point pairs or the second subset of the plurality of point pairs comprises the subset of point pairs for the plurality of regions.

K: The method of any one of example F through example J, wherein the determining the calibration function comprises applying, based on an association between the first points and the plurality of regions, a weighting factor to individual of the plurality of point pairs.

L: The method of any one of example F through example K, wherein the first points in a first region of the plurality of regions are assigned a first weight based on the number of the first points in the first region.

M: The method of any one of example F through example L, wherein: at least one of the first image data comprises a third image of the environment captured by the first camera or the second image data comprises a fourth image of the environment captured by the second camera; and the point pair further comprises at least one of a third point in the third image or a fourth point in the fourth image.

N: The method of any one of example F through example M, further comprising: detecting edges in the first image or the second image; receiving lidar data comprising a point cloud of the environment captured by a lidar sensor disposed on the system, the point cloud comprising data about a portion of the second field of view overlapping the first field of view; determining a plurality of depth discontinuities in the lidar data; comparing the plurality of depth discontinuities to the edges by projecting the plurality of depth discontinuities into the first image or the second image as a plurality of projected points; and determining distances between the edges and the plurality of projected points; and determining, based at least in part on the distances, a correction function representative of a misalignment of at least one of the first camera or the second camera and the lidar sensor.

O: An example non-transitory computer-readable medium storing instructions that, when executed, cause one or more processors to perform operations comprising: receiving first image data comprising a first image of an environment captured by a first camera disposed on a system, the first camera having a first field of view; receiving second image data comprising a second image of the environment captured by a second camera disposed on the system, the second camera having a second field of view at least partially overlapping the first field of view; determining a plurality of point pairs, individual of the point pairs comprising a first point in the first image and a second point in the second image corresponding to the first point; determining first errors for individual point pairs of the plurality of point pairs, the first errors comprising, at least in part, a distance between the first point and an epipolar line corresponding to the second point in the first image; determining second errors for individual point pairs of the plurality of point pairs, the second errors comprising, at least in part, a distance between the first point and a reprojection of the corresponding second point estimating a depth of the first point; determining, based at least in part on at least one of the first errors or the second errors, a subset of the plurality of point pairs; determining, from the subset of the plurality of point pairs, a calibration function representative of at least one of an estimated relative pose of the first camera and the second camera or an estimated camera intrinsic.

P: The non-transitory computer-readable medium of example O, wherein the determining the plurality of point pairs comprises: extracting a plurality of first features from the first image; extracting a plurality of second features from the second image; matching, as matched features, first features from the first plurality of features and second features of the second plurality of features; and determining, as the plurality of point pairs, a plurality of pixels associated with the matched features, wherein the plurality of first features and the plurality of second features comprise one or more of FREAK, AKAZE, FAST, SURF, SIFT, ORB, or BRIEF features.

Q: The non-transitory computer-readable medium of example O or example P, wherein the determining the subset of the plurality of point pairs comprises: determining point pairs having projection errors equal to or below a threshold error.

R: The non-transitory computer-readable medium of any one of example O through example Q, wherein the determining the subset of the plurality of point pairs comprises: dividing the first image containing the first points into a plurality of regions; and determining, based at least in part on the first errors or the second errors, a subset of point pairs of the plurality of regions, wherein the subset of the plurality of point pairs comprises the subset of point pairs for the plurality of regions.

S: The method of any one of example O through example R, wherein the determining the calibration function comprises applying, based on an association between the first points and the plurality of regions, a weighting factor to individual of the plurality of point pairs.

T: The method of any one of example O through example S, wherein the first points in a first region of the plurality of regions are assigned a first weight based on the number of the first points in the first region.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
a vehicle configured to traverse through an environment, the vehicle comprising:
a plurality of cameras disposed on a body of the vehicle such that fields of view of at least two of the cameras at least partially overlap;
one or more processors; and
computer-readable media storing instructions executable by the one or more processors, wherein the instructions cause the system to perform operations comprising:
receiving a set of images from the plurality of cameras, the set of images comprising images representing the environment at substantially a first time and captured by the plurality of cameras,
determining, for the set of images, a plurality of point pairs, each of the point pairs comprising a first point in one of the images of the set of images and a second point in another of the images of the set of images, the first point and the second point corresponding to a same image feature;
determining first errors associated with the plurality of point pairs, the first errors comprising, at least in part, a first distance between the first point and an epipolar line corresponding to the second point;
determining, based at least in part on the first errors, a first subset of the plurality of point pairs;
determining, from the first subset of the plurality of point pairs, a first correction function representative of a misalignment of an estimated relative pose of the cameras;
determining second errors associated with the plurality of point pairs, the second errors comprising, at least in part, a second distance between the first point and a re-projection of the second point estimating a point depth;
determining, based at least in part on the second errors, a second subset of the plurality of point pairs;
determining, from the second subset of the plurality of point pairs, a second correction function representative of a misalignment of an estimated relative pose of the cameras;
calibrating the plurality of cameras, based at least in part on the first correction function and the second correction function.

2. The system of claim 1, wherein the determining the first errors comprises:
determining a fundamental matrix which describes a relationship between the one of the images and the other of the images;
determining, for individual point pairs of the plurality of point pairs and based at least in part on the fundamental matrix, the epipolar line corresponding to the second point in the first image, and
comparing the first point to the epipolar line in the first image.

3. The system of claim 1, wherein determining the second error comprises undistorting the first point according to a camera intrinsic.

4. The system of claim 1, wherein at least one of the determining the first subset of the plurality of point pairs or the determining the second subset of the plurality of point pairs comprises:
dividing an image of the set of images containing the first points and at least one of the epipolar lines or the re-projections into a plurality of regions; and
determining a subset of point pairs for individual of the plurality of regions,
wherein the first subset of the plurality of point pairs or the second subset of the plurality of point pairs comprises the subset of point pairs for the plurality of regions.

5. The system of claim 1, wherein the vehicle is an autonomous vehicle, the one or more computer-readable media storing further instructions executable by the one or more processors, wherein the further instructions cause the system to perform operations comprising:
calibrating, based at least in part on the calibration function, additional image data received from the plurality of cameras as calibrated data;
generated, based at least in part on the calibrated data, a trajectory to control the autonomous vehicle; and
controlling the autonomous vehicle based at least in part on the trajectory.

6. A method comprising:
receiving first image data comprising a first image of an environment captured by a first camera disposed on a system, the first camera having a first field of view;
receiving second image data comprising a second image of the environment captured by a second camera disposed on the system, the second camera having a second field of view at least partially overlapping the first field of view;
determining a plurality of point pairs, a point pair of the plurality of point pairs comprising a first point in the first image and a second point in the second image corresponding to the first point;
determining first errors for individual point pairs of the plurality of point pairs, the first errors comprising, at least in part, a distance between the first point and an epipolar line corresponding to the second point in the first image;
determining second errors for individual point pairs of the plurality of point pairs, the second errors comprising, at least in part, a distance between the first point and a reprojection of the corresponding second point, the reprojection based at least in part on an estimated depth of the first point;
determining, based at least in part on at least one of the first errors or the second errors, a subset of the plurality of point pairs; and
determining, from the subset of the plurality of point pairs, a calibration function representative of at least one of an estimated relative pose of the first camera and the second camera or an estimated camera intrinsic of the first camera or the second camera.

7. The method of claim 6, wherein the determining the first errors comprises:
determining a fundamental matrix;
determining, for the point pair of the plurality of point pairs and based at least in part on the fundamental matrix, the epipolar line corresponding to the second point,
projecting the epipolar line in the first image, and
determining a distance between the first point and the epipolar line in the first image.

8. The method of claim 6, wherein the determining the plurality of point pairs comprises:
extracting a plurality of first features from the first image;
extracting a plurality of second features from the second image;
matching, as matched features, first features from the first plurality of features and second features of the second plurality of features; and
determining, as the plurality of point pairs, a plurality of pixels associated with the matched features,
wherein the plurality of first features and the plurality of second features comprise one or more of FREAK, AKAZE, FAST, SURF, SIFT, ORB, or BRIEF features.

9. The method of claim 6, wherein the reprojection is further based on undistorting the first point based, at least in part, on the estimated camera intrinsic of the first camera.

10. The method of claim 6, wherein the determining the subset of the plurality of point pairs comprises:
dividing the first image containing the first points into a plurality of regions; and
determining, based at least in part on the first errors or the second errors, a subset of point pairs for a region of the plurality of regions,
wherein the first subset of the plurality of point pairs or the second subset of the plurality of point pairs comprises the subset of point pairs for the plurality of regions.

11. The method of claim 10, wherein the determining the calibration function comprises applying, based on an association between the first points and the plurality of regions, a weighting factor to individual of the plurality of point pairs.

12. The method of claim 11, wherein the first points in a first region of the plurality of regions are assigned a first weight based on the number of the first points in the first region.

13. The method of claim 6, wherein:
at least one of the first image data comprises a third image of the environment captured by the first camera or the second image data comprises a fourth image of the environment captured by the second camera; and
the point pair further comprises at least one of a third point in the third image or a fourth point in the fourth image.

14. The method of claim 6, further comprising:
detecting edges in the first image or the second image;
receiving lidar data comprising a point cloud of the environment captured by a lidar sensor disposed on the system, the point cloud comprising data about a portion of the second field of view overlapping the first field of view;
determining a plurality of depth discontinuities in the lidar data;
comparing the plurality of depth discontinuities to the edges by projecting the plurality of depth discontinuities into the first image or the second image as a plurality of projected points; and
determining distances between the edges and the plurality of projected points; and determining, based at least in part on the distances, a correction function representative of a misalignment of at least one of the first camera or the second camera and the lidar sensor.

15. A non-transitory computer-readable medium storing instructions that, when executed, cause one or more processors to perform operations comprising:

receiving first image data comprising a first image of an environment captured by a first camera disposed on a system, the first camera having a first field of view;

receiving second image data comprising a second image of the environment captured by a second camera disposed on the system, the second camera having a second field of view at least partially overlapping the first field of view;

determining a plurality of point pairs, individual of the point pairs comprising a first point in the first image and a second point in the second image corresponding to the first point;

determining first errors for individual point pairs of the plurality of point pairs, the first errors comprising, at least in part, a distance between the first point and an epipolar line corresponding to the second point in the first image;

determining second errors for individual point pairs of the plurality of point pairs, the second errors comprising, at least in part, a distance between the first point and a reprojection of the corresponding second point estimating a depth of the first point;

determining, based at least in part on at least one of the first errors or the second errors, a subset of the plurality of point pairs;

determining, from the subset of the plurality of point pairs, a calibration function representative of at least one of an estimated relative pose of the first camera and the second camera or an estimated camera intrinsic.

16. The non-transitory computer-readable medium of claim 15, wherein the determining the plurality of point pairs comprises:

extracting a plurality of first features from the first image;

extracting a plurality of second features from the second image;

matching, as matched features, first features from the first plurality of features and second features of the second plurality of features; and determining, as the plurality of point pairs, a plurality of pixels associated with the matched features, wherein the plurality of first features and the plurality of second features comprise one or more of FREAK, AKAZE, FAST, SURF, SIFT, ORB, or BRIEF features.

17. The non-transitory computer-readable medium of claim 15, wherein the determining the subset of the plurality of point pairs comprises:

determining point pairs having projection errors equal to or below a threshold error.

18. The non-transitory computer-readable medium of claim 15, wherein the determining the subset of the plurality of point pairs comprises:

dividing the first image containing the first points into a plurality of regions; and determining, based at least in part on the first errors or the second errors, a subset of point pairs of the plurality of regions, wherein the subset of the plurality of point pairs comprises the subset of point pairs for the plurality of regions.

19. The method of claim 18, wherein the determining the calibration function comprises applying, based on an association between the first points and the plurality of regions, a weighting factor to individual of the plurality of point pairs.

20. The method of claim 19, wherein the first points in a first region of the plurality of regions are assigned a first weight based on the number of the first points in the first region.

* * * * *

UNITED STATES PATENT AND TRADEMARK OFFICE
CERTIFICATE OF CORRECTION

PATENT NO. : 10,298,910 B1
APPLICATION NO. : 16/023507
DATED : May 21, 2019
INVENTOR(S) : Till Kroeger et al.

Page 1 of 1

It is certified that error appears in the above-identified patent and that said Letters Patent is hereby corrected as shown below:

On the Title Page

Item (54) and in the Specification, Column 1, Lines 1-2, change the title from "INFRASTRUCTURE FREE INTRINSIC CALIBRATION" to "INFRASTRUCTURE FREE CALIBRATION".

Signed and Sealed this
Twenty-seventh Day of August, 2019

Andrei Iancu
*Director of the United States Patent and Trademark Office*